(12) United States Patent
Inaoka et al.

(10) Patent No.: US 7,409,824 B2
(45) Date of Patent: Aug. 12, 2008

(54) EXHAUST CONTROL SYSTEM FOR MOTORCYCLE

(75) Inventors: Hiroshi Inaoka, Saitama (JP); Sadamichi Enjyo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 153 days.

(21) Appl. No.: 10/902,837

(22) Filed: Aug. 2, 2004

(65) Prior Publication Data

US 2005/0081516 A1   Apr. 21, 2005

(30) Foreign Application Priority Data

Aug. 27, 2003 (JP) ............... 2003-303590
Aug. 27, 2003 (JP) ............... 2003-303602
Aug. 27, 2003 (JP) ............... 2003-303607

(51) Int. Cl.
*F01N 7/00* (2006.01)
*B62D 61/00* (2006.01)
*B60K 13/04* (2006.01)

(52) U.S. Cl. ............ 60/324; 180/218; 180/296; 180/309

(58) Field of Classification Search ............ 60/324; 180/218, 296, 309
See application file for complete search history.

(56) References Cited

U.S. PATENT DOCUMENTS 3,756,623 A * 9/1973 Whittler ............... 280/304.3
3,901,474 A * 8/1975 Kubota ................. 251/159
4,475,622 A * 10/1984 Tsunoda et al. ......... 181/227
4,767,108 A * 8/1988 Tanaka et al. ......... 267/140.12
4,785,626 A * 11/1988 Shiraishi ............... 60/313
4,795,420 A * 1/1989 Sakurai et al. .......... 60/313
4,830,135 A * 5/1989 Yamashita ............. 180/229
5,330,028 A * 7/1994 Handa et al. .......... 180/219
6,336,321 B1 * 1/2002 Sagara et al. .......... 60/324
6,609,367 B2 * 8/2003 Nakayasu et al. ....... 60/324
6,655,134 B2 * 12/2003 Nakayasu et al. ....... 60/324
2005/0109024 A1 * 5/2005 Nohl et al. ............ 60/324

FOREIGN PATENT DOCUMENTS

JP   2002-138828 A   5/2002

\* cited by examiner

*Primary Examiner*—Thomas Denion
*Assistant Examiner*—Loren Edwards
(74) *Attorney, Agent, or Firm*—Birch, Stewart, Kolasch & Birch, LLP

(57) ABSTRACT

An exhaust pipe is connected to an engine with a muffler attached to an exhaust pipe. An exhaust valve is provided for controlling the flow rate of an exhaust gas on the side of the exhaust pipe. A recessed portion is directed toward the center of the vehicle body and is formed on the side of the swing arm with the exhaust valve being disposed in front in the vicinity of the recessed portion. Operating wires are laid along an air cleaner case so as to open and close the exhaust valve. A servo motor is disposed at such a position that it can be covered with the seat cowl so as to drive the operating wires. The muffler is provided with a muffler protector and a cover portion that integral extends from the muffler protector with the exhaust valve being covered with the cover portion.

23 Claims, 21 Drawing Sheets

EXHAUST CONTROL SYSTEM FOR MOTORCYCLE

CROSS-REFERENCE TO RELATED APPLICATIONS

The present application claims priority under 35 USC 119 to Japanese Patent Application Nos. 2003-303590 filed on Aug. 27, 2003; 2003-303607 filed on Aug. 27, 2003 and 2003-303602 filed on Aug. 27, 2003 the entire contents thereof are hereby incorporated by reference.

BACKGROUND OF THE INVENTION

1. Field of the Invention

The present invention relates to an exhaust control system for a motorcycle which is capable of controlling the flow rate of an exhaust gas.

2. Description of Background Art

An exhaust control system for a motorcycle in which a valve is provided in an exhaust passage in an engine exhaust system and the flow rate of an exhaust gas flowing through the exhaust passage is controlled by the valve has been put to practical use.

In the exhaust control system for a motorcycle in practical use, it has sufficient that the valve is provided in an exhaust pipe provided as the exhaust passage and the valve is opened and closed.

Such an exhaust control system for a motorcycle, wherein a connection pipe for connecting a muffler to an exhaust pipe is provided therein with an exhaust valve has been known. See, for example, Japanese Patent Laid-open No. 2002-138828.

FIG. 19 of the present drawings is a copy of FIG. 4 of Japanese Patent Laid-open No. 2002-138828. In FIG. 19, the same symbols as in Japanese Patent Laid-open No. 2002-138828 are used.

The exhaust control system for a motorcycle in Japanese Patent Laid-open No. 2002-138828 has a structure in which a multi-cylinder engine 16 is mounted on a vehicle body frame 2 with exhaust pipes 20 ... (" ... " means a plurality here and hereinafter) extending from individual cylinders of the engine 16. Some exhaust pipes 20, 20 are collected to a first collecting pipe (not shown) with a right coupling pipe 31 extending from the first collecting pipe. Other exhaust pipes 20, 20 are collected to a second collecting pipe 30 with a left coupling pipe 32 extending from the second collecting pipe 30. The left and right coupling pipe 32, 31 are collected to a third collecting pipe 33 with a connection pipe 22 being connected to the third coupling pipe 33. A muffler 21 is connected to the connection pipe 22 and the connection pipe 22 is provided therein with a vale mechanism 39 for controlling the flow rate of an exhaust gas.

A drive cable 40 extends from the valve mechanism 39. The drive cable 40 extends through the surrounding of a pivot shaft 13 of a swing arm 14 and a drive motor 41 is provided at the tip end of the drive cable 40. A CPU (central processor unit) 42 is provided for controlling the drive motor 41.

However, the exhaust control system for a motorcycle described in Japanese Patent Laid-open No. 2002-138828 has a problem in view of the fact that the drive cable 40 extends from the valve mechanism 39 and extends through the surrounding of the pivot shaft 13 of the swing arm 14. The drive cable 40 (hereinafter referred to as "the operating cable") may possibly interfere with movable portions such as the swing arm 14.

In addition, in the exhaust control system for a motorcycle according to Japanese Patent Laid-open No. 2002-138828, the drive motor 41 (hereinafter referred to as "the servo motor") is disposed on the rear side of the engine 16. Therefore, there is a demerit in that thermal influences of the engine 16 are exerted on the drive motor 41 and the CPU (central processor unit) 42 (hereinafter referred to as "the control unit"). Further, it may be desired to take into account the effective utilization of free spaces.

Further, in the exhaust control system for a motorcycle described in Japanese Patent Laid-open No. 2002-138828, a portion of the valve mechanism 39 projects toward the center of the vehicle body. Therefore, it is necessary to obviate the interference of the valve mechanism 39 with the vehicle body or component parts mounted on the vehicle. For example, there has been a problem wherein the connection pipe 22 has been moved outwardly in the vehicle width direction for obviating an interference with the valve mechanism 39 (hereinafter referred to as "the exhaust valve") with the vehicle body side. As a result, the vehicle width is enlarged.

Still further, an exhaust control system for motorcycle wherein a valve mechanism is covered with a cover or cowling 23 is known. The valve mechanism is covered with a cowling 23. See, for example, Japanese Patent Laid-open No. 2002-138828.

The exhaust control system for a motorcycle described in Japanese Patent Laid-open No. 2002-138828, has a problem wherein the valve mechanism 39 is covered with the cowling 23 and the valve mechanism 39 (hereinafter referred to as "the exhaust valve") is disposed at a position too far to cover with the cowling 23. Thus, it is necessary to use a new component part or parts, which increases the number of component parts.

In the case of covering the exhaust valve with a cover or the like, it is desired to cover the exhaust valve without increasing the number of component parts, by diverting the existing component parts as much as possible.

SUMMARY AND OBJECTS OF THE INVENTION

It is an object of the present invention to provide a technology which solves the problem relating to the interference of an exhaust valve, in an exhaust control system for a motorcycle, with the vehicle body side in the case of disposing the exhaust valve in an exhaust pipe. In addition, it is an object to install the exhaust valve in the exhaust pipe without enlarging the vehicle width.

It is an object of the present invention to provide a technology for solving the problem due to interference of the operating cable with the movable portions and for laying out the operating cable in a well-settled manner while utilizing the existing component parts, and to provide a technology for solving the problem of thermal influences on the servo motor and the control unit and for disposing the servo motor and the control unit in a thermally non-influenced condition through effective utilization of free spaces.

In order to attain the above object, an exhaust control system for a motorcycle resides in an exhaust control system for a motorcycle including a swing arm vertically swingably mounted to a vehicle body frame. An engine is mounted on the vehicle body frame with an exhaust pipe connected to the engine. A muffler is attached to the exhaust pipe. An exhaust valve for controlling the flow rate of an exhaust gas is provided on the side of the exhaust pipe. A recessed portion directed toward the center of the vehicle body is provided on the side of the swing arm and the exhaust valve is disposed to front on the vicinity of the recessed portion.

According to the present invention, the exhaust valve for controlling the flow rate of an exhaust gas is provided on the side of the exhaust pipe, the recessed portion directed toward the center of the vehicle body is provided on the side of the swing arm, and the exhaust valve is disposed to front on the vicinity of the recessed portion.

More specifically, the swing arm is provided with the recessed portion, and the exhaust valve is disposed to front on the recessed portion, whereby the exhaust valve can be disposed closer to the vehicle body center side. Thus, the exhaust valve in the exhaust control system for a motorcycle can be disposed in the exhaust pipe without enlarging the vehicle width.

The present invention includes an operating wire for operating the exhaust valve that is also disposed to front on the side of the recessed portion.

With the operating wire for operating the exhaust valve disposed to front on the side of the recessed portion, the operating wire can be led out from the exhaust valve without projecting outwardly in the vehicle width direction.

The present invention includes the exhaust valve for controlling the flow rate of the exhaust gas that is provided in the vicinity of a connection portion between the exhaust pipe and the muffler and on the side of the exhaust pipe.

For example, in the case where different mufflers are attached to one kind of motorcycle so as to provide a plurality of models to the same system of motorcycles and to cope with the tastes of the users, a system in which only the muffler can be replaced is preferable for enhancing the workability in replacement and for reducing the cost of the muffler to be replaced.

More specifically, when the exhaust valve for controlling the flow rate of the exhaust gas is provided in the vicinity of the connection portion between the exhaust pipe and the muffler and on the side of the exhaust pipe, it is possible to replace the muffler without influencing the exhaust valve. As a result, the workability in replacement can be enhanced, and the cost of the muffler to be replaced can be reduced.

In the present invention, the exhaust valve for controlling the flow rate of the exhaust gas is provided on the side of the exhaust pipe, the recessed portion directed toward the center of the vehicle body is provided on the side of the swing arm, and the exhaust valve is disposed to front on the vicinity of the recessed portion, so that the exhaust valve can be disposed closer to the vehicle body center side. As a result, the exhaust valve in the exhaust control system for a motorcycle can be disposed in the exhaust pipe without enlarging the vehicle width.

In the present invention, the operating wire for operating the exhaust valve is also disposed to front on the recessed portion side, so that the operating wire can be led out from the exhaust valve without projecting outwards in the vehicle width direction.

In the present invention, the exhaust valve for controlling the flow rate of the exhaust gas is provided in the vicinity of the connection portion between the exhaust pipe and the muffler and on the side of the exhaust pipe, so that the muffler can be replaced without influencing the exhaust valve. As a result, the workability in replacement of the muffler can be enhanced, and the cost of the muffler to be replaced can be reduced.

The invention pertaining to an exhaust control system for a motorcycle as set forth in the present invention resides in an exhaust control system for a motorcycle that includes an air cleaner case and an engine mounted on a vehicle body frame with an exhaust pipe connected to the engine and an exhaust valve for controlling the flow rate of an exhaust gas. The exhaust valve is provided in the exhaust pipe with a seat disposed on the upper side of the engine and a seat cowl provided in the surrounding of the seat. An operating wire is disposed along the air cleaner case so as to open and close the exhaust valve. A servo motor is disposed at such a position that the servo motor can be covered with the seat cowl so as to drive the operating wire.

For example, where an operating cable can be laid in a well-settled manner and the servo motor and the control unit can be disposed through effective utilization of free spaces, it is favorable for enhancing the space efficiency of the vehicle body.

In view of this, the operating wire is disposed along the air cleaner case so as to open and close the exhaust valve, and the servo motor is disposed at such a position that the servo motor can be covered with the seat cowl so as to drive the operating wire.

The air cleaner case is a static member and, by disposing the operating wire along the air cleaner case, it is possible to lay the operating cable in a well-settled manner. In addition, the servo motor is disposed at such a position that the servo motor can be covered with the seat cowl, whereby free spaces are utilized effectively and an enhancement of the space efficiency of the vehicle body is contrived.

The present invention provides a water-proofing wall for preventing the penetration of water drops that is provided at an upper portion of the air cleaner case. The operating wire is laid along the water-proofing wall.

With the operating wire laid along the water-proofing wall of the air cleaner case, it is possible to lay the operating wire in the state of being restricted to a predetermined route.

The present invention provides the servo motor that is disposed at a rear portion of the seat cowl in an inclined state so as to approach the center of the vehicle body in the direction from a front end portion toward a rear end portion of the servo motor in plan view.

In general, a rear portion of a seat cowl assumes a constricted shape. In view of this, with the servo motor disposed at a rear portion of the seat cowl in an inclined state so as to approach the center of the vehicle body in the direction from a front end portion toward a rear end portion of the servo motor in plan view, the servo motor can be disposed without causing the seat cowl to bulge.

The present invention provides a control unit for controlling the opening of the exhaust valve that is disposed opposite to the servo motor.

Where the control unit for controlling the opening of the exhaust valve is thus disposed opposite to the servo motor, it is possible to disperse the control unit and the servo motor. As a result, a further enhancement of the space efficiency of the vehicle body can be contrived.

In the present invention, the operating wire is disposed along the air cleaner case so as to open and close the exhaust valve, whereby the operating cable can be laid in a well-settled manner. In addition, since the servo motor is disposed at such a position that the servo motor can be covered with the seat cowl so as to drive the operating wire, free spaces can be utilized effectively. As a result, an enhancement of the space efficiency of the vehicle body can be contrived.

In the present invention, the water-proofing wall for preventing penetration of water drops is formed at an upper portion of the air cleaner case and the operating wire is disposed along the water-proofing wall, so that the operating wire can be laid in the state of being restricted to a predetermined route.

In the present invention, the servo motor is disposed at a rear portion of the seat cowl in an inclined manner so as to approach the center of the vehicle body in the direction from a front end portion toward a rear portion of the servo motor in plan view, so that the servo motor can be disposed without causing the seat cowl to bulge.

In the present invention, the control unit for controlling the opening of the exhaust valve is disposed opposite to the servo motor, so that the control unit and the servo motor can be dispersed. As a result, a further enhancement of the space efficiency of the vehicle body can be contrived.

It is an object of the present invention to provide a technology for solving the problem relating to an increase in the number of component parts in the case of covering the appearance of an exhaust valve and for covering the exhaust valve without increasing the number of component parts.

The present invention pertaining to an exhaust control system for a motorcycle wherein an exhaust control system for a motorcycle includes an engine mounted on a vehicle body frame with an exhaust pipe connected to the engine. A muffler is attached to the exhaust pipe with an exhaust valve for controlling the flow rate of an exhaust gas. The exhaust valve is provided in the exhaust pipe. The muffler is provided with a muffler protector and a cover portion integrally extends from the muffler protector. The exhaust valve is covered with the cover portion.

For example, in the case of covering an exhaust valve with a cover or the like, if the exhaust valve can be covered by diverting the existing component parts and without increasing the number of component parts, the cost of the motorcycle can be suppressed, which is preferable.

In view of this, the muffler is provided with a muffler protector, a cover portion integrally extends from the muffler protector, and the exhaust valve is covered with the cover portion.

With the cover portion integrally extends from the muffler protector and with the exhaust valve covered with the cover portion, it is possible to contrive a reduction in the number of component parts, as compared to the case of covering the exhaust valve with other component part(s). As a result, a reduction in the cost of the motorcycle can be contrived.

In the present invention the exhaust valve is provided with a mount portion for mounting the cover portion thereto.

With the exhaust valve provided with the mount portion for mounting the cover portion thereto, it is possible to prevent both vibrations of the cover portion and vibrations of the exhaust valve.

In the present invention, the muffler is provided with the muffler protector, the cover portion integrally extends from the muffler protector, and the exhaust valve is covered with the cover portion, so that a reduction in the number of component parts can be contrived, as compared to the case of covering the exhaust valve with other component part(s). As a result, a reduction in the cost of the motorcycle can be contrived.

In the present invention, the exhaust valve is provided with the mount portion for mounting the cover portion thereto, so that both vibrations of the cover portion and vibrations of the exhaust valve can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the present invention will be described below, referring to the accompanying drawings.

Figure 1:
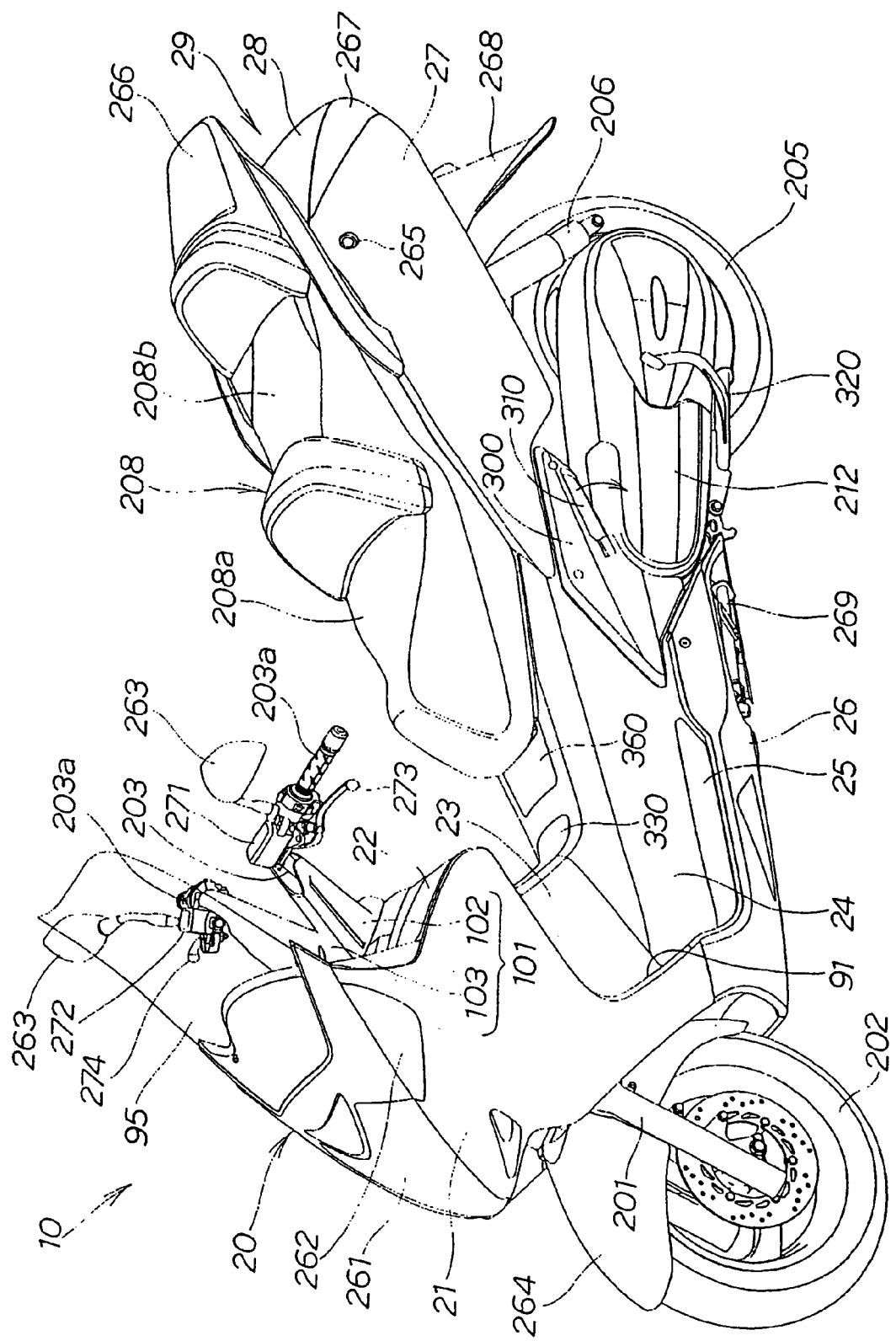
FIG. 1 is a left-side perspective view of a motorcycle on which an exhaust control system according to the present invention is mounted.

FIG. 1 is a left side perspective view of a motorcycle on which an exhaust control system according to the present invention is mounted. A motorcycle 10 is a scooter type vehicle having a low floor type floor 25.

A vehicle body cover 20 for entirely covering a vehicle body frame of the motorcycle 10 includes a front cowl 21 for covering a front portion of the vehicle body frame described later and an upper portion of a front wheel. An upper cover 22 is provided for covering an opening at an upper portion of the front cowl 21 with an inner cover 23 for covering a rear portion of the front cowl 21. A center cover 24 extends rearwardly from the rear end of the inner cover 23 to cover the central portion in the longitudinal direction of the vehicle body frame. A low floor type floor 25 extends outwardly from the lower outer edge of the center cover 24 to mount the feet of the driver thereon with a floor skirt 26 extending downwardly from the outer edge of the low floor type floor 25. Rear side covers 27, 27 (27 on the depth side is not shown) extend rearwardly from the center cover 24 to cover rear side portions of the vehicle body frame. A rear cover 28 extends rearwardly from the rear ends of the rear side covers 27, 27 to cover a rear portion of the vehicle body frame. In addition, the rear side covers 27, 27 and the rear cover 28 constitute a seat cowl 29.

The front cowl 21 includes a transparent windscreen 95 at an upper portion thereof. The inner cover 23 includes a leg shield 91 for covering front portions of the legs of the driver.

Further, the motorcycle 10 includes a steering handle 203 at a front portion of the vehicle body, and a seat 208 and step holders 300 at a rear portion of the vehicle body.

The steering handle 203 is a product similar in shape to the so-called chopper type steering handle in which grips 203a, 203a are set comparatively high and bent rearwardly. The steering handle 203 is covered with a steering handle cover 101. The steering handle cover 101 is composed of a lower-portion steering handle cover 102 for covering left and right lower portions of the steering handle 203 with an upper-portion steering handle cover 103 for covering upper portions of the steering handle 203.

The seat 208 is a double seat composed of a seat front portion 208a for seating the driver thereon, and a seat rear portion 208b for seating the passenger thereon. The step holder 300 is disposed adjacent to a rear portion of the center cover 24, and is attached wherein a pillion step (passenger's step) 310 can be stored therein and be exposed.

In FIG. 1, a headlamp 261 is provided together with a winker 262, mirrors 263, 263, a front fender 264, a lock 265 for seat locking, a rear spoiler 266, a tail lamp 267, a rear fender 268, a sub-stand 269, a main stand 320, an oil supply lid 330 denotes and a side lid 360 for inspection.

In addition, master cylinders 271, 272 are provided for generating a braking liquid pressure by operation of brake levers 273, 274.

Figure 2:
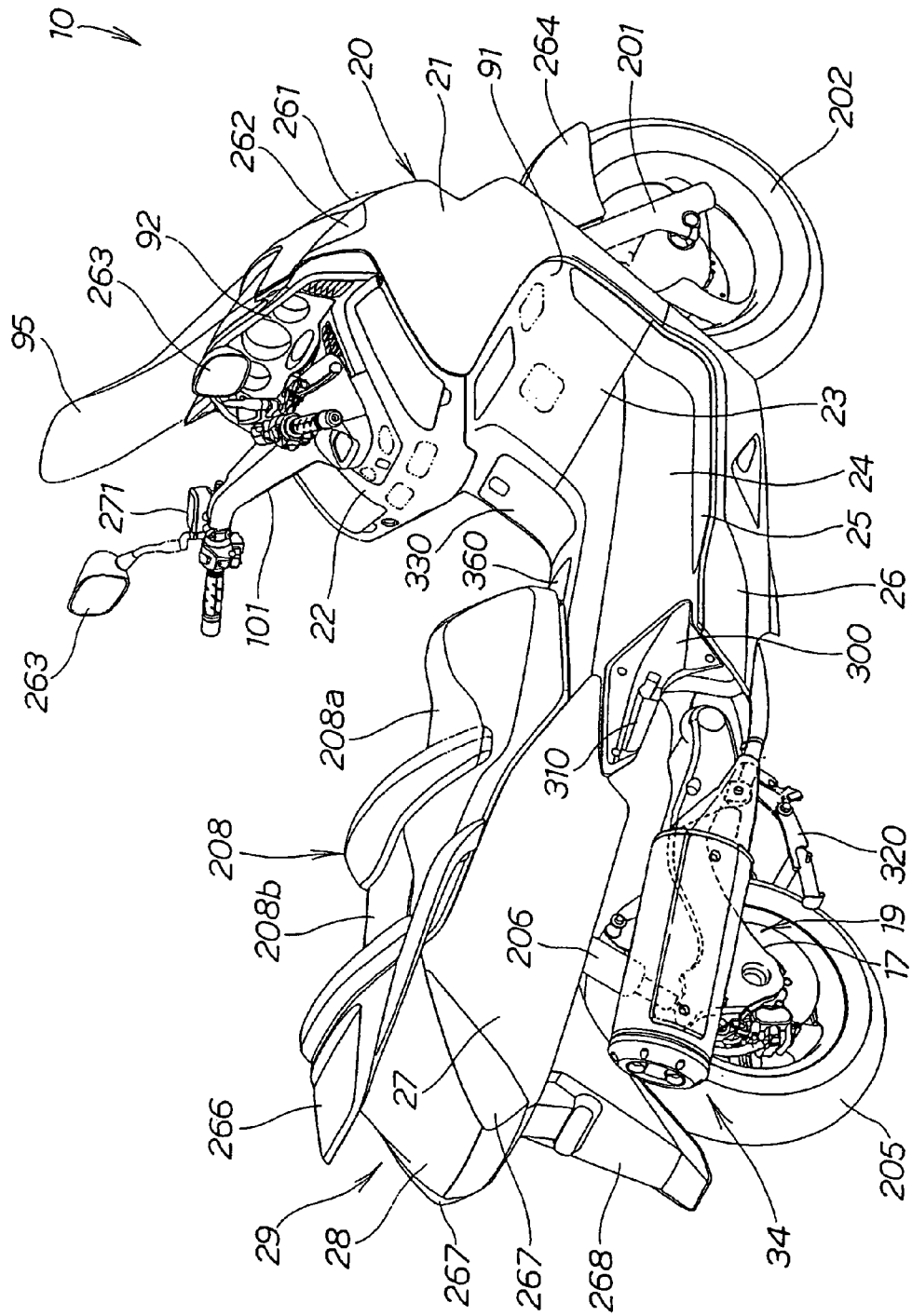
FIG. 2 is a right-side perspective view of the motorcycle on which the exhaust control system according to the present invention is mounted.

FIG. 2 is a right side perspective view of the motorcycle on which the exhaust control system according to the present invention is mounted. A meter panel 92 is provided at an upper portion of the front cowl 21 and on the rear side of the windscreen 95. As is clear from the above description, the windscreen 95, the leg shield 91 and the meter panel 92 can be provided at front portions of the vehicle body.

Further, FIG. 2 illustrates a step holder 300 including a pillion step 310 that is disposed also on the right side of the motorcycle 10. A muffler 34 (exhaust silencer) is attached to the engine.

Figure 3:
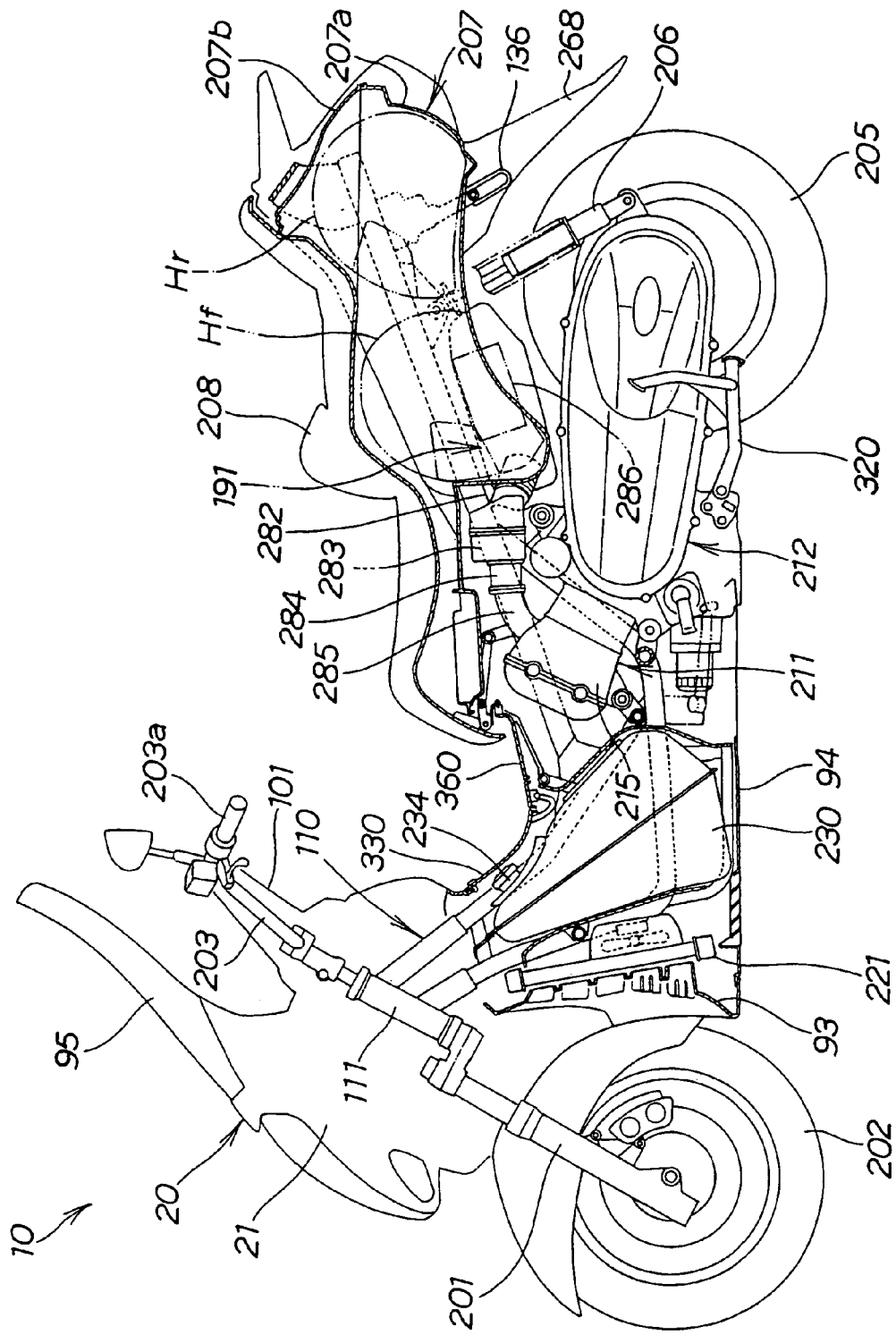
FIG. 3 is a side sectional view of the motorcycle on which the exhaust control system according to the present invention is mounted.

FIG. 3 is a side sectional view of the motorcycle on which the exhaust control system according to the present invention is mounted. The motorcycle 10 is a scooter type vehicle composed mainly of a vehicle body frame 110, a front fork 201 attached to a head pipe 111 of the vehicle body frame 110 so as to be swingable to the left and the right with a front wheel 202 mounted to the front fork 201. The steering handle 203 is coupled to the front fork 201. An engine 211 is mounted to a rear portion of the vehicle body frame 110 with a power transmission mechanism 212 vertically swingable about a crankshaft of the engine 211. A rear wheel 205 is mounted to a rear portion of the power transmission mechanism 212 with a rear shock absorber unit 206 by which a rear end portion of the power transmission mechanism 212 is suspended from the vehicle body frame 110. A luggage box 207 is attached to a rear upper portion of the vehicle body frame 110 with the seat 208 disposed on the luggage box 207 and attached so that it can be opened and closed.

The front fork 201 is a reverse U-shaped fork disposed on the lower side of the head pipe 111. An upper portion of the front fork 201 and the head pipe 111 are covered with the front cowl 21.

The engine 211 is a water-cooled type two-cylinder engine in which left and right two cylinder heads 215 are disposed to be roughly horizontal while being slightly inclined toward the front upper side. The power transmission mechanism 212 is a centrifugal clutched belt converter type continuously variable transmission for transmitting the power of the engine 211 to the rear wheel 205.

The luggage box 207 is a box which is elongate in the front-rear direction of the vehicle body and in which two helmets Hf and Hr can be stored in front and rear portions. The luggage box 207 is composed of a lower box 207a, and an upper box 207b laid on a rear upper portion of the lower box 207a.

In FIG. 3, a front lower cover 93 is provided together with an under cover 94, an air cleaner 191, a radiator 221, a fuel tank 230, an oil supply port 234, a connecting tube 282, an air chamber 283, a throttle valve 284, an inlet pipe 285 and a battery 286.

Figure 4:
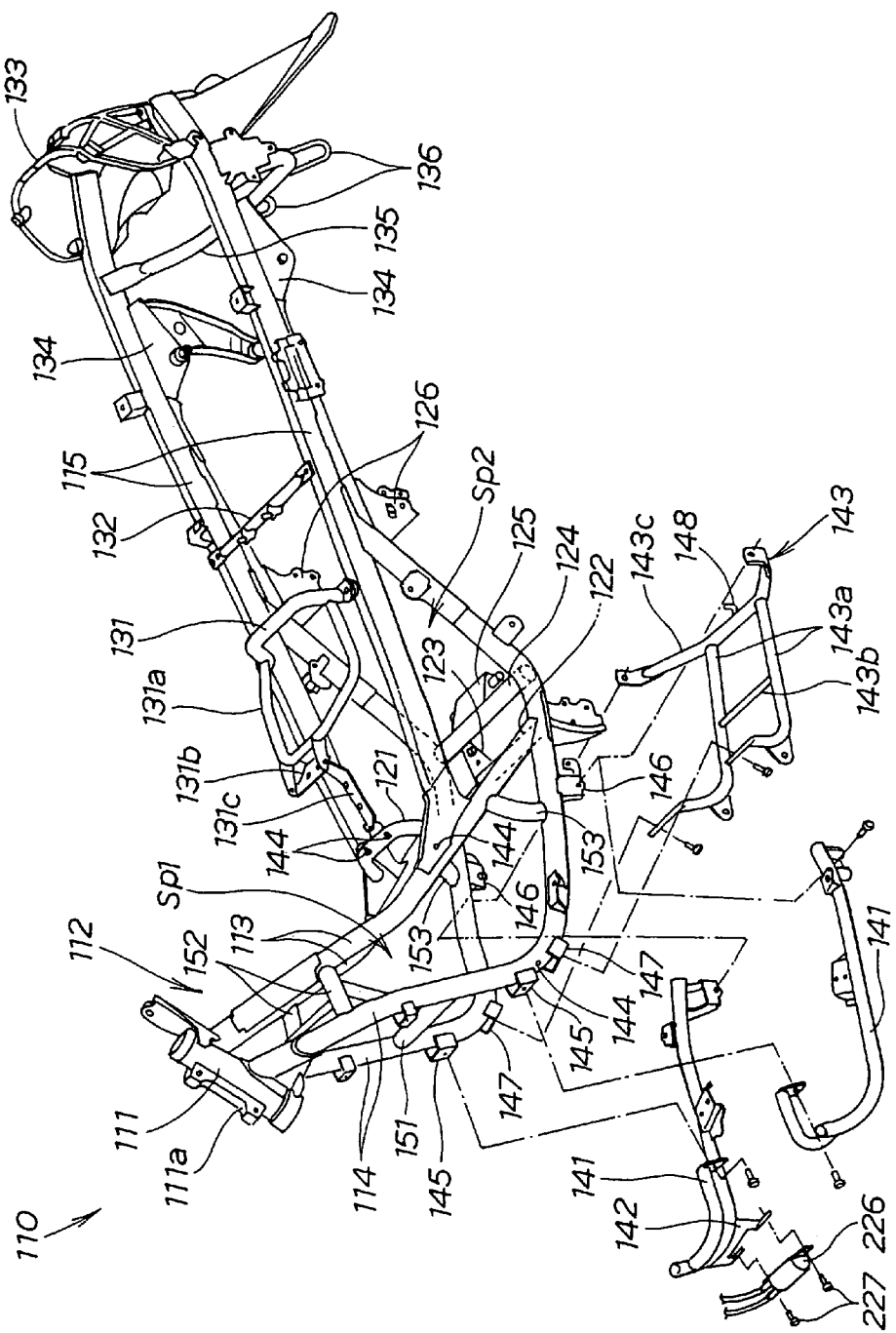
FIG. 4 is a perspective view of a vehicle body frame of the motorcycle on which the exhaust control system according to the present invention is mounted.

FIG. 4 is a perspective view of the vehicle body frame of the motorcycle on which the exhaust control system according to the present invention is mounted. The vehicle body frame 110 is a double cradle type integral frame in which a front frame 112 continuous with the head pipe 111 and a left-right pair of seat rails (rear frames) 115, 115 extend rearwardly from rear portions of the front frame 112 and are coupled by welding. The head pipe 111 includes a cowl stay bracket 111a.

The front frame 112 has a structure in which a left-right pair of upper frames 113, 113 extend rearwardly and downwardly from the head pipe 111, a left-right pair of down tubes 114, 114 extend downwardly from the head pipe 111 on the lower side of the pair of upper frames 113, 113, and the lower ends of the pair of down tubes 114, 114 extend rearwardly and are connected to the lower ends of the pair of upper frames 113, 113 and further extend rearwardly and upwardly. Since the front frame 112 is thus configured, it is possible to provide a space portion Sp1 that is roughly triangular in a side view, which is surrounded by the pair of upper frames 113, 113 and the pair of down tubes 114, 114.

A first cross member 121 of a reverse U-shaped in a front view is bridgingly provided between the front end of the left rear frame 115 and the front end of the right rear frame 115, a second cross member 112 is bridgingly provided between the lower end of the left upper frame 113 and the lower end of the right upper frame 113 and an engine first bracket 123 is connected to the central position, in the vehicle width direction, of the second cross member 122.

A third cross member 124 is bridgingly provided between a rear end portion of a horizontal portion of the left down tube 114 and a rear end portion of a horizontal portion of the right down tube 114, an engine second bracket 125 is connected to the central position, in the vehicle width direction, of the third cross member 124, and engine third brackets 126, 126 are connected to the rear ends of the left and right down tubes 114, 114.

The left-right pair of rear frames 115, 115 are each a member having a vertically elongate sectional shape wherein one end is connected to an intermediate portion in the longitudinal direction of one of the left-right pair of upper frames 113, 113 and whose other end extends rearwardly. Here, the term "vertically elongate sectional shape" means a sectional shape whose vertical dimension is greater than the horizontal dimension. Specifically, the rear frames 115, 115 are each composed of an angular pipe having a vertically elongate rectangular section.

In FIG. 4, a U-shaped stay 131a is provided together with a seat hinge support portion 131b, an extension member 131c, a floor support stay 141, an under frame 143, a headed pin 144, a stay 142, left and right side members 143a, 143a, a central cross member 143b, a rear cross member 143c, brackets 145 to 147, a hook 148, a front cross member 151, reinforcing members 152 and 153, an engine ignition coil 226 and a bolt 227.

Figure 5:
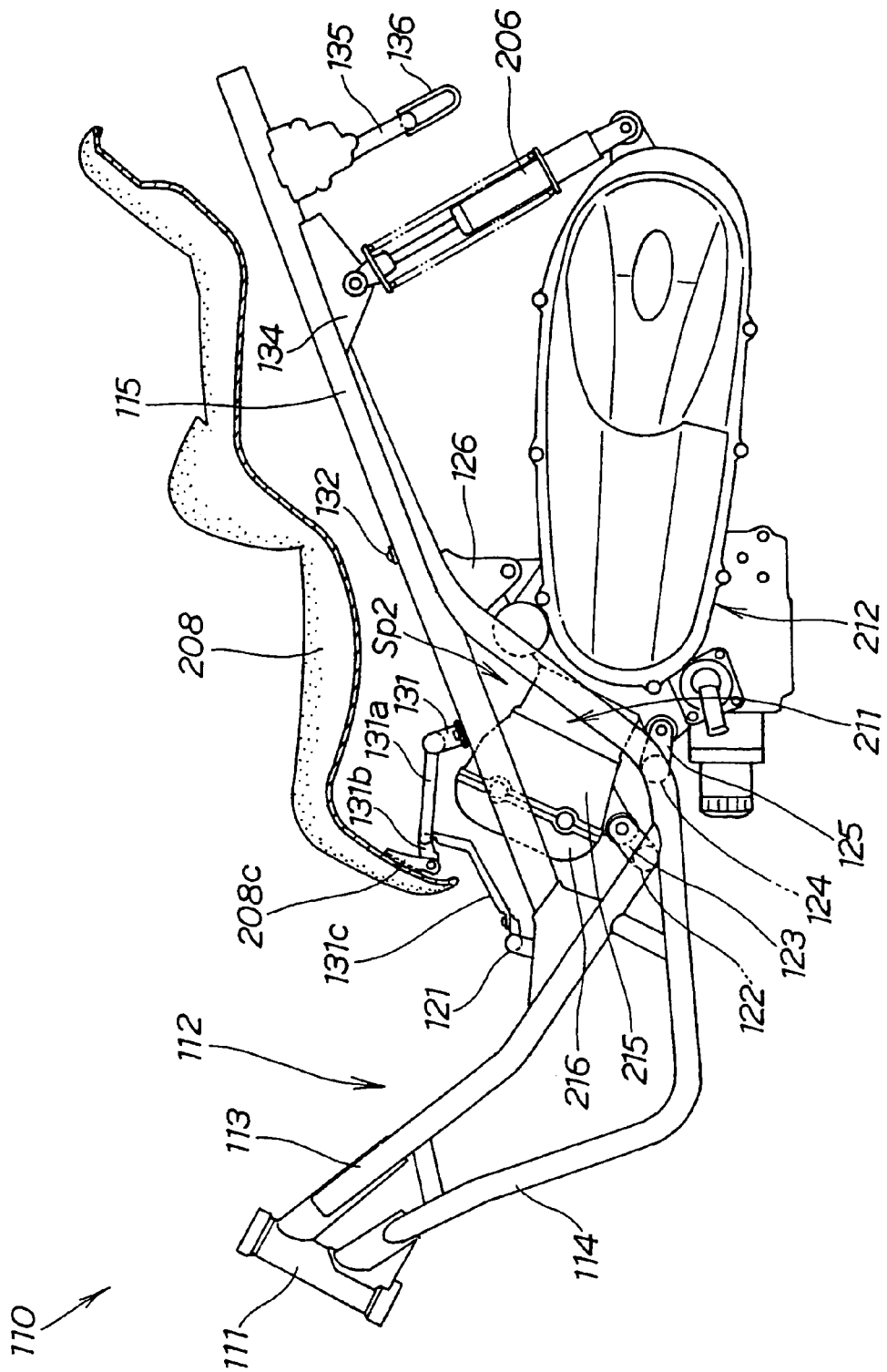
FIG. 5 is a left side view of an engine, a power transmission mechanism and a seat in the motorcycle on which the exhaust control system according to the present invention is mounted.

FIG. 5 is a left side view of the engine, the power transmission mechanism and the seat in the motorcycle on which the exhaust control system according to the present invention is mounted. FIG. 4 illustrates that the engine 211 and the power transmission mechanism 212 are disposed on the rear side of the front frame 112 and on the lower side of the pair of rear frames 115, 115. The engine 211 is attached to portions in the vicinity of the connection portions between the front frame 112 and the left and right rear frames 115, 115 (only the left one is shown in FIG. 5, here and hereinafter).

More specifically, a space portion Sp2 that is roughly triangular in side view is surrounded by the pair of upper frames 113, 113, the pair of down tubes 114, 114 and the pair of rear frames 115, 115 and is provided at a rear portion of the front frame 112. A cylinder head 215 and a head cover 216 of the engine 211 are disposed in the space portion Sp2. A front lower portion of the engine 211 is attached to the engine first bracket 123 with a rear lower portion of the engine 211 being attached to the engine second bracket 125. Rear upper portions of the engine 211 are attached to the engine third brackets 126, 126. In addition, a front-portion and an intermediate-portion rear cross members 131 and 132 are disposed on the upper side of the engine 211.

Further, FIG. 5 illustrates that rear end portions of the power transmission mechanism 212 are suspended from left and right shock absorber brackets 134, 134 through left and right shock absorber units 206, 206 and that the front-portion rear cross member 131 functions also as a member for supporting a seat hinge 208c of the open/close type seat 208.

The vehicle body frame 110 has a structure in which the cross members 131 to 133 (for symbol 133, refer to FIG. 4) are detachably bridgingly attached between the left-right pair of rear frames 115, 115 on the upper side of the engine 211, in the vehicle body frame of the scooter type vehicle in which the left-right pair of rear frames 115, 115 (115 on one side is not shown) extend rearwardly from rear portions of the front frame 112 and are continuous with the head pipe 111. The seat 208 and the rear shock absorber units 206, 206 (206 on one side is not shown) are supported by these rear frames 115, and the engine 211 is disposed on the rear side of the front frame 112 and on the lower side of the pair of rear frames 115, 115.

The exhaust control system 11 for motorcycle (hereinafter referred to simply as "the exhaust control system 11") will now be described more in detail below.

Figure 6:
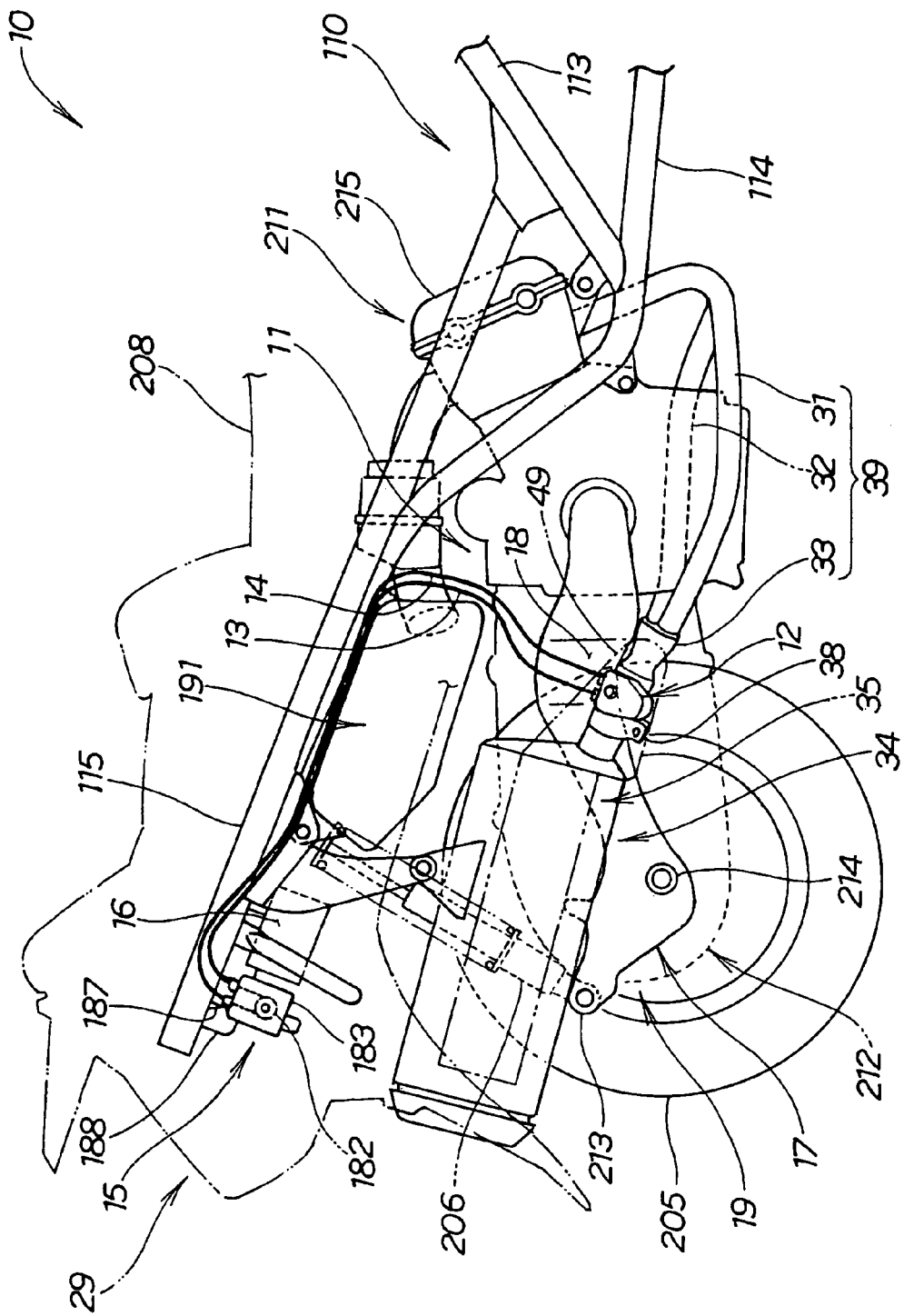
FIG. 6 is a side view of the exhaust control system for motorcycle according to the present invention.

FIG. 6 is a side view of the exhaust control system for a motorcycle according to the present invention.

The exhaust control system 11 for the motorcycle (hereinafter referred to simply as "the exhaust control system 11") includes an exhaust valve 12 that is attached to the exhaust pipe 39 so as to vary the flow rate of an exhaust gas. Operating wires 13, 14 are provided for operating the exhaust valve 12 with a servo motor 15 for driving the operating wires 13, 14 and a control unit (ECU) 16 for controlling the servo motor 15 to thereby control the flow rate of the exhaust gas.

Generally, an ECU (electronic control unit) means an electronic control device for controlling an AT (automatic transmission), an ABS (antilock brake system) or the like by computer.

A rear shock absorber arm 17 located in the vicinity of the exhaust valve 12 is a member which is added integrally to the above-mentioned power transmission mechanism 212 so as to support the right rear shock absorber unit 206 and to rotatably support the rear wheel 205. A shock absorber support portion 213 is provided for supporting the rear shock absorber unit 206 with a rear wheel support portion 214 for supporting the rear wheel 205 and a recessed portion 18 recessed toward the center of the vehicle body. Further, the rear shock absorber arm 17 is a member for constituting a swing arm (rear fork) 19 for rotatably supporting the rear wheel 205 with the power transmission mechanism 212 and the rear shock absorber arm 17.

Figure 7:
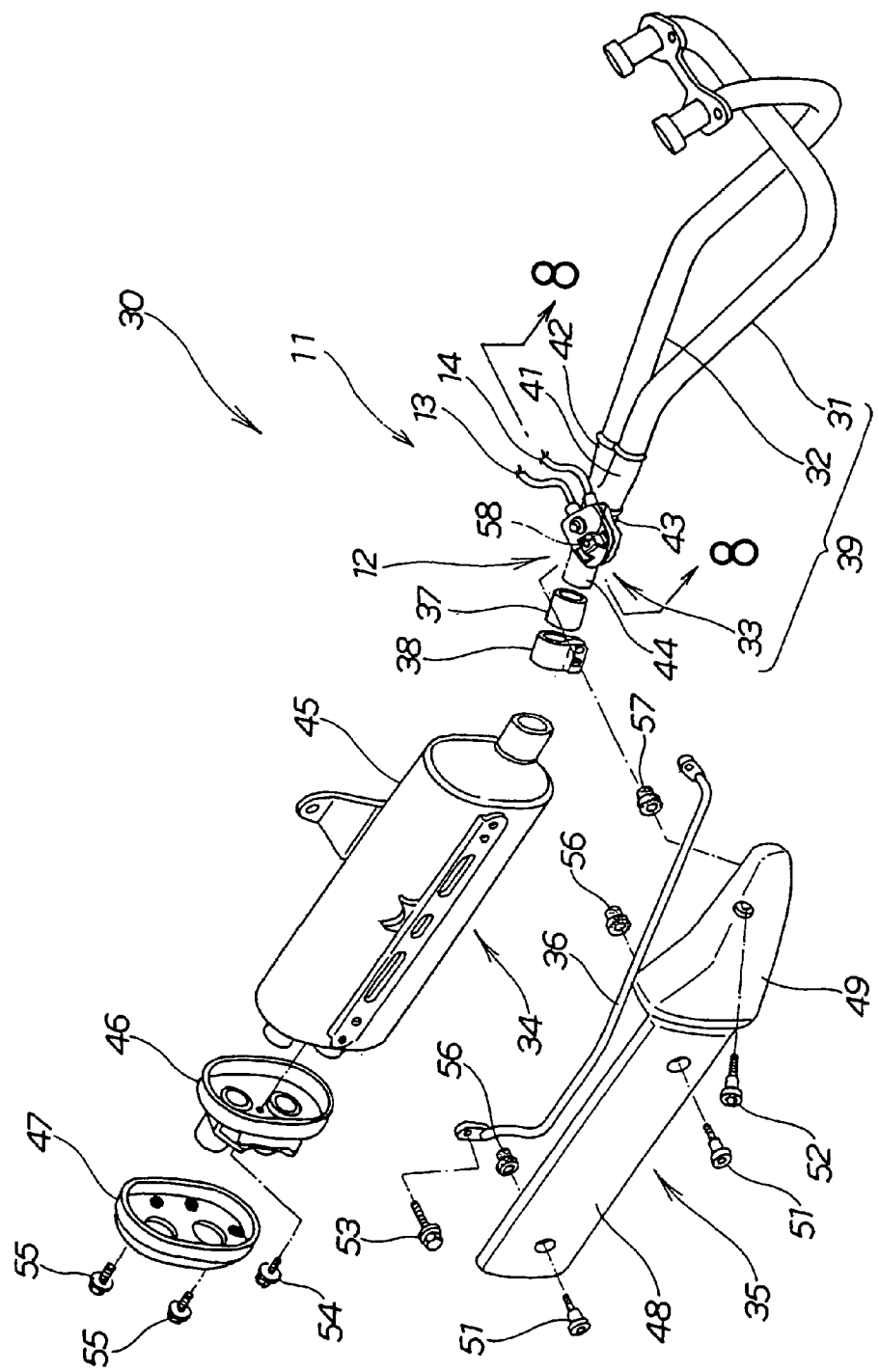
FIG. 7 is an exploded perspective view of an exhaust system on which the exhaust control system according to the present invention is mounted.

FIG. 7 is an exploded perspective view of the exhaust system on which the exhaust control system according to the present invention is mounted. The exhaust system 30 includes first and second pipes 31 and 32 extending from the engine 211 (see FIG. 6) with an exhaust collecting pipe 33 for bundling the first and second pipes 31 and 32. A muffler 34 is connected to the exhaust collecting pipe 33 with a muffler protector 35 for covering the muffler 34, a muffler guard 36 for guarding the muffler 34 and a band 38 for fixing the muffler 34 to the exhaust collecting pipe 33 through a gasket 37.

In general, the exhaust pipe means includes an exhaust pipe that is connected to each cylinder of an engine; in the present specification, the exhaust pipe 39 means a pipe composed of the first and second pipes 31 and 32 and the exhaust collecting pipe 33.

The exhaust collecting pipe 33 includes a first connection portion 41 for connection with the first pipe 31, a second connection portion 42 for connection with the second pipe 32, a valve mount portion 43 for mounting of the exhaust valve 12 and a connection portion 44 for connection with the muffler 34.

The muffler 34 includes a muffler main body 45, a tail pipe assembly 46 attached to the muffler main body 45 and a tail cover 47 to be capped onto the tail pipe assembly 46.

The muffler protector 35 includes a protector main body portion 48 for covering a side surface of the muffler main body 45 and a cover portion 49 integrally extending from the protector main body portion 48 toward the front side of the vehicle body so as to cover the exhaust valve 12.

In FIG. 7, a bolt 51 for fixing the protector main body portion 48 to the muffler main body 45 through an elastic bush 56 is provided together with a bolt 52 for fixing the cover portion 49 to a mount portion 58 of the exhaust valve 12 through an elastic bush 57, a bolt 53 for fixing the muffler guard 36 to the muffler main body 45, a bolt 54 for fixing the tail pipe assembly 46 to the muffler main body 45 and a bolt 55 for fixing the tail cover 47 to the muffler main body 45 through the tail pipe assembly 46.

The exhaust control system 11 has a structure in which the muffler protector 35 is provided for the muffler 34, the cover portion 49 integrally extends from the muffler protector 35, and the exhaust valve 12 is covered with the cover portion 49. In the motorcycle 10 (see FIG. 2) including the engine 211 (see FIG. 6) mounted on the vehicle body frame 110 (see FIG. 4), the exhaust pipe 39 connected to the engine 211, the muffler 34 is attached to the exhaust pipe 39, and the exhaust valve 12 is provided in the exhaust pipe 39 so as to control the flow rate of the exhaust gas.

For example, in the case of covering an exhaust valve with a cover or the like, if the covering can be achieved by diverting the existing component parts and without increasing the number of component parts, it is possible to suppress the cost of the motorcycle, which is preferable.

In view of this, by integrally extending the cover portion 49 from the muffler protector 35 and covering the exhaust valve 12 with the cover portion 49, the number of component parts can be reduced, as compared with the case of covering the exhaust pipe with other component part. As a result, it is possible to contrive a reduction in the cost of the motorcycle 10 (see FIG. 6). In addition, by integrally extending the cover portion 49 from the muffler protector 35 and covering the exhaust valve 12 with the cover portion 49, it is possible to enhance the design and commercial value of the motorcycle 10.

Further, by providing the exhaust valve 12 with the mount portion 58 for mounting the cover portion 49 thereon, it is possible to prevent both vibrations of the cover portion 49 and vibrations of the exhaust valve 12. In addition, mounting the muffler protector 35 onto the muffler 34 and the exhaust valve 12 through elastic members such as the elastic bushings 56 and 57 is effective also for shielding of noises, vibrations or heat.

Figure 8:
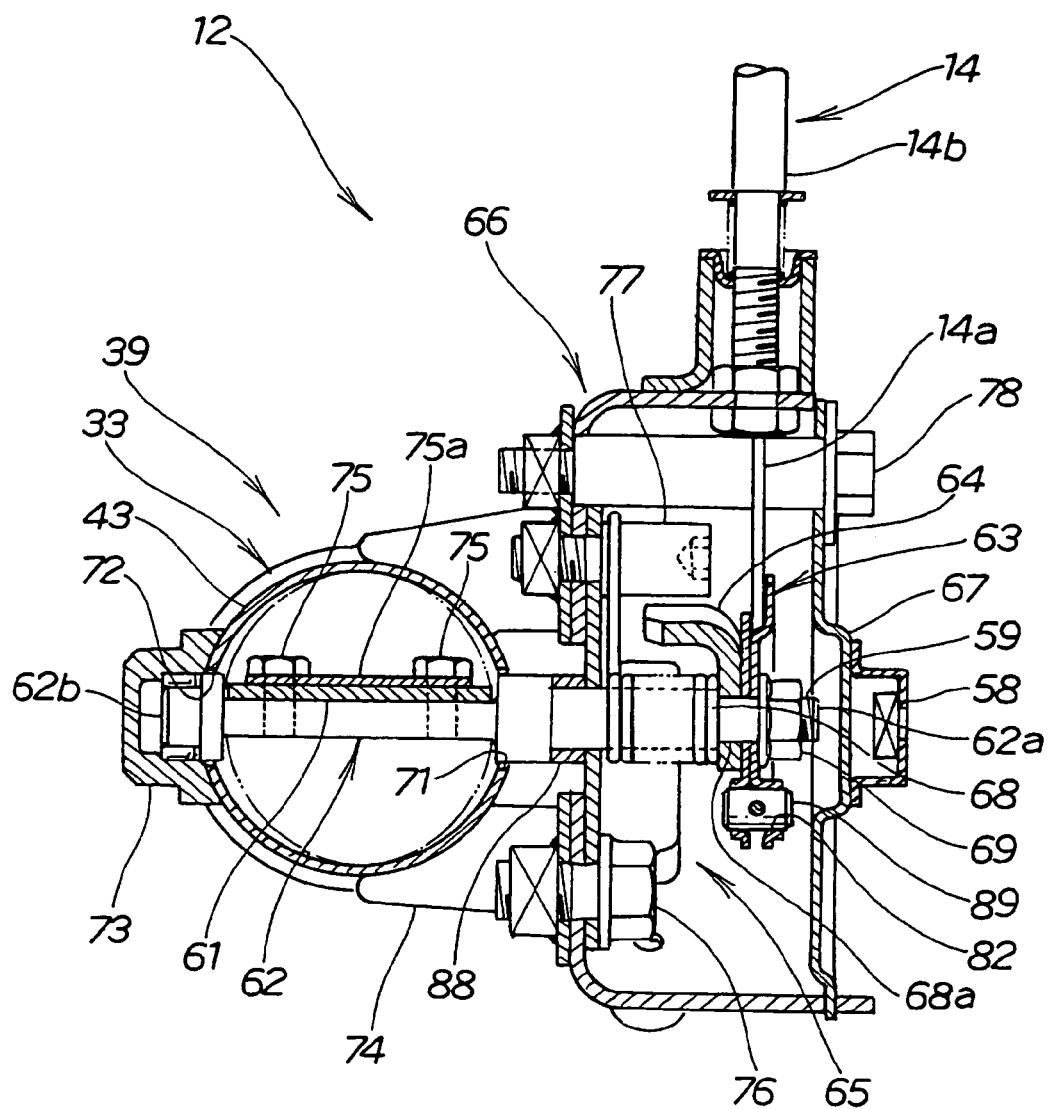
FIG. 8 is a sectional view taken along line 8-8 of FIG. 7.

FIG. 8 is a sectional view taken along line 8-8 of FIG. 7, illustrating a vertical section of the exhaust valve 12 and the exhaust pipe 39 (the exhaust collecting pipe 33).

The exhaust valve 12 includes a valve 61 for varying the flow rate of the exhaust gas in the exhaust pipe 39 (exhaust collecting pipe 33); a valve rod 62 as a shaft of the exhaust valve for mounting the valve 61; a pulley 63 for rotating the valve rod 62; an L-shaped stopper piece 64 formed separately from the pulley 63 and attached to the valve rod 62; a stopper receiver 65 against which the stopper piece 64 is abutted for restricting the opening/closing angle of the valve 61; a case 66 for containing the pulley 63, the stopper piece 64 and the stopper receiver 65; a lid 67 provided with the above-mentioned mount portion 58 for covering the case 66; a torsion spring 68 for biasing in the opening direction of the valve 61 between the case 66 and the pulley 63; and a nut 69 which is for fitting the stopper piece 64 and the pulley 63 to a width-across-flat portion 68a elliptic in section and formed at one end 62a of the valve rod 62 and in screw-engagement with a male screw portion 59 formed at one end of the valve rod 62 for the purpose of fixation.

In addition, by intermediately providing the torsion spring 68 for biasing in a valve-opening direction between the pulley 63 and the stopper receiver 65, the initialization position of the exhaust valve 12 can be set in the valve-opening direction. As a result, the enhancement of the reliability of the exhaust valve 12 can be contrived, as will be described later.

A valve mount portion 43 of the exhaust collecting pipe 33 includes through-holes 71 and 72 for passing the other end 62b of the valve rod 62 therethrough, a bearing portion 73 is provided on the side of the through-hole 72 for supporting the other end 62b of the valve rod 62 with a stay 74 for attaching the case 66 thereto.

In FIG. 8, a bolt 75 is provided for fixing the valve 61 to the valve rod 62 through a seat plate 75a together with a bolt 76 for fixing the case 66 to the stay 74 through the stopper receiver 65, a bolt 77 for fixing the case 66 to the stay 74 through the stopper receiver 65 and for locking one end of the torsion spring 68, and a stepped bolt 78 for fixing the lid 67 covering the case 66 directly to the stay.

Figure 9:
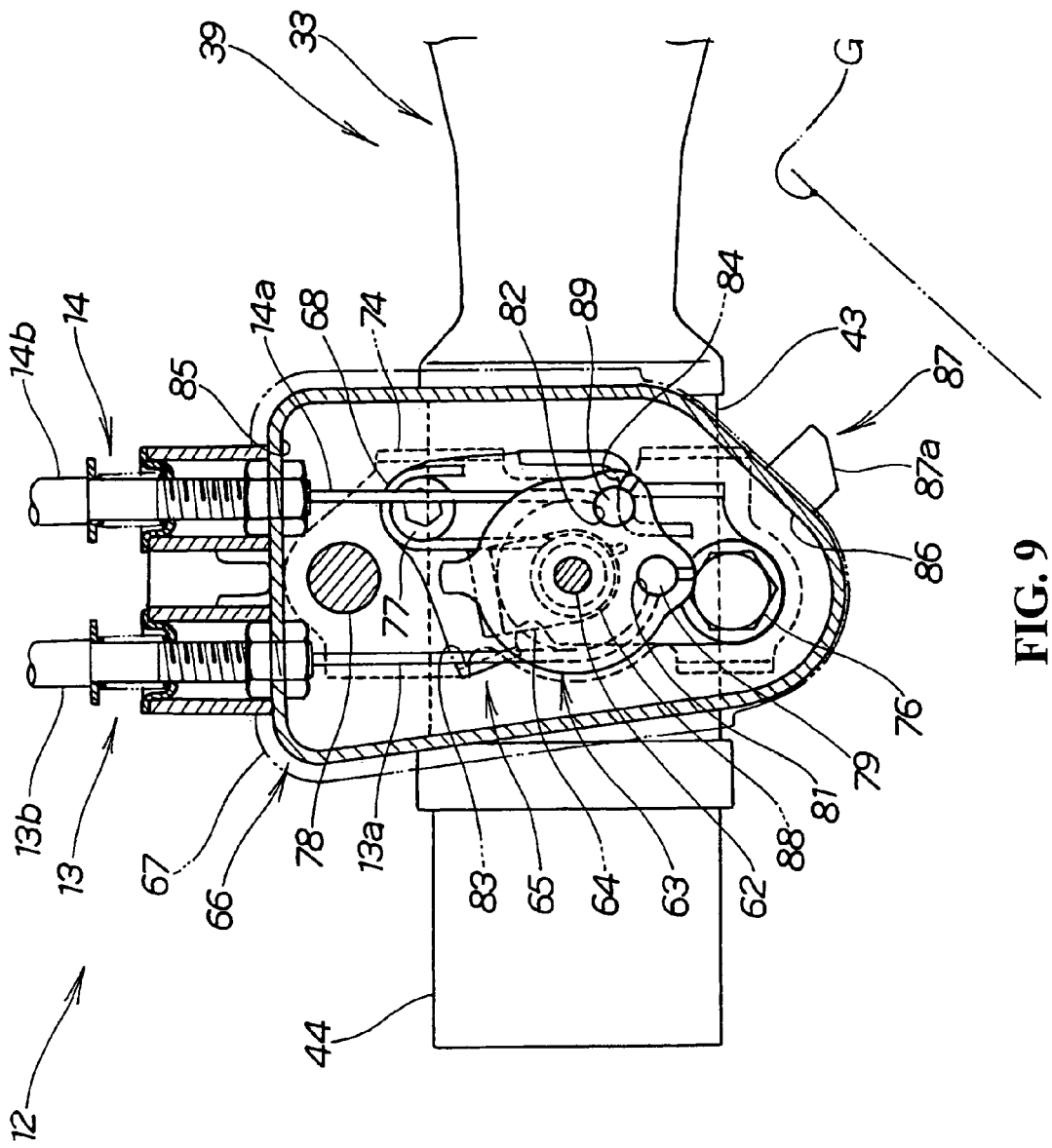
FIG. 9 is a front sectional view of an exhaust valve in the exhaust control system according to the present invention.

FIG. 9 is a front sectional view of the exhaust valve in the exhaust control system according to the present invention. The pulley 63 is provided with a first fitting portion 81 for fitting thereto a cable end 79 attached to the tip end of an inner cable 13a of the operating wire 13, and a second fitting portion 82 for fitting thereto a cable end 89 attached to the tip end of an inner cable 14a of the operating wire 14. In addition, outer tubes 13b and 14b are provided for the respective operating wires 13 and 14 with G being the ground.

In addition, the stopper receiver 65 is provided with a first locking portion 83 for locking the stopper piece 64 when the valve 61 (see FIG. 8) is opened, and a second locking portion 85 for locking the stopper piece 64 when the valve 61 is closed. The first locking portion 83 is set at a position with a margin of 10° counterclockwise in FIG. 9 from the condition of full opening of the valve 61. The contact of the stopper piece 64 with the second locking portion 84 is set at a position with a margin of 10° clockwise in FIG. 9 from the condition of full closing of the valve 61.

In other words, by providing the stopper receiver 65 with the first locking portion 83 for locking the stopper piece 64 when the valve 61 is opened and with the second locking portion 84 for locking the stopper piece 64 when the valve 61 is closed, it is possible to restrict the valve position in the valve-opening direction and in the valve-closing position. As a result, the first locking portion 83 or the second locking portion 84 can be utilized as a stopper at the time of mounting the pulley 63 to the valve 61, whereby it is possible to contrive an enhancement of the assemblability of the exhaust valve 12.

The exhaust control system 11 (see FIG. 6) can be said to be a system in which the exhaust valve 12 is provided with the valve 61 for varying the flow rate of the exhaust gas in the exhaust pipe 39 with the valve rod 62 for attaching the valve 61 thereto, the pulley 63 for rotating the valve rod 62, the stopper piece 64 formed separately from the pulley 63 and attached to the valve rod 62, and the stopper receiver 65 against which the stopper piece 64 is abutted to thereby restrict the opening/closing angle of the valve 61. In the motorcycle 10 (see FIG. 2) the engine 211 is mounted on the vehicle body frame 110, the exhaust pipe 39 is connected to the engine 211, and the exhaust valve 12 is provided in the exhaust pipe 39 for controlling the flow rate of the exhaust gas.

If the exhaust valve component parts such as the pulley can be simplified in shape, it is preferable for enhancing the productivity of the exhaust valve component parts.

In view of this, the stopper piece 64 is formed separately from the pulley 63, and the stopper receiver 65 against which the stopper piece 64 is abutted is provided, whereby the exhaust valve component parts such as the pulley 63 can be simplified in shape. As a result, an enhancement in the productivity of the exhaust valve component parts can be contrived.

The case 66 includes a mount surface 85 on which to mount the operating wires 13 and 14, an inclined surface 86 inclined relative to the mount surface 85, a drain pipe 87 attached to the inclined surface 86 for draining from the case 66, and a case bearing portion 88 for rotatably supporting an intermediate portion of the valve rod 62. The tip end 87*a* of the drain pipe 87 is cut so as to be set along the inclined surface 86.

In general, the exhaust pipe has many portions inclined forwardly or rearwardly relative to the ground, and where the exhaust valve is attached to the portion inclined forwardly or rearwardly, the exhaust valve is, in many cases, mounted in an inclined posture. It is also known that, in many cases, the operating wires are led out substantially upwardly from the exhaust valve.

In view of this, a structure has been adopted in which the case 66 for the exhaust valve 12 is provided with the mount surface 85 for the operating wires 13 and 14, the inclined surface 86 is provided which is inclined on the side opposite to the mount surface 85, the drain pipe 87 for draining is connected to the inclined surface 86, and the tip end 87*a* of the drain pipe 87 is set along the inclined surface 86.

When the exhaust valve 12 is mounted in an inclined posture and the operating wires 13 and 14 are led out substantially upwardly, the inclined surface 86 becomes substantially parallel to the ground, so that draining from the inside of the case 66 can be performed appropriately. In addition, with the tip end 87*a* of the drain pipe 87 set along the inclined surface 86, it is possible to earn the height from the ground.

In addition, since the drain pipe 87 for draining is connected to the inclined surface 86, it is possible to prevent a backflow of water and to prevent flying water from penetrating from the front side.

Further, with the tip end of the drain pipe 87 being set along the inclined surface 86, it is possible to earn the height from the ground and to minimize an influence thereof on the bank angle.

Figure 10:
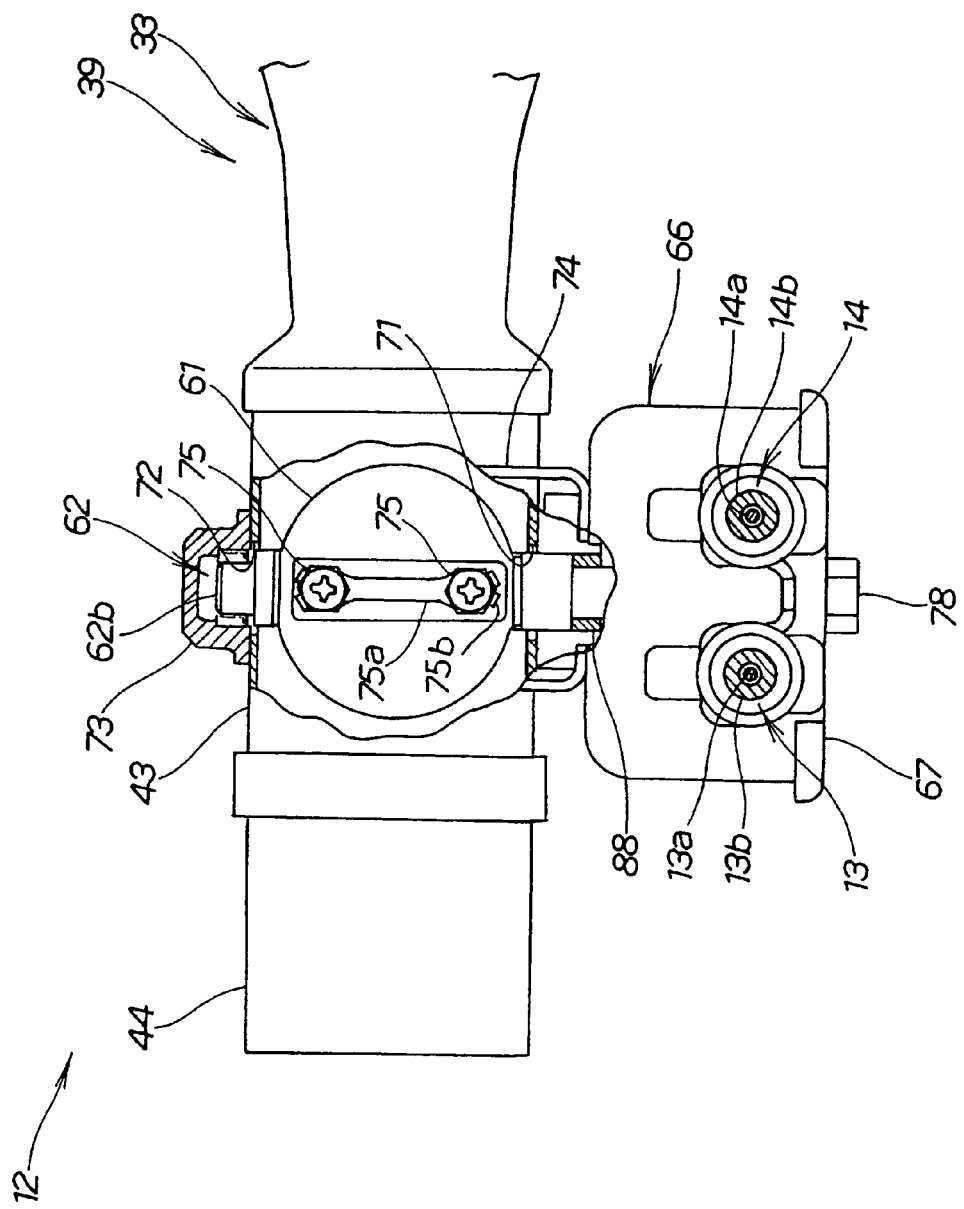
FIG. 10 is a plan sectional view of the exhaust valve in the exhaust control system according to the present invention.

FIG. 10 is a plan sectional view of the exhaust valve in the exhaust control system according to the present invention wherein the exhaust valve 12 has a structure in which the other end 62*b* of the valve rod 62 is inserted in the through-holes 71 and 72 in the valve mount portion 43. The valve 61 is attached to the side of the other end 62*b* of the valve rod 62 through the seat plate 75*a* by the bolts 75, 75 with the case bearing portion 88 of the case 66 being fitted over from the side of one end 62*a* (see FIG. 8) of the valve rod 62. The case 66 is fixed to the stay 74 of the vale mount portion 43, whereby the valve rod 62 can be rotatably supported on the bearing portion 73 and the case bearing portion 88. In addition, the seat plate 75 is provided with anti-turning portions 75*b* . . . which can be after-bent. Thus, the loosening of the bolts 75, 75 is prevented by the anti-turning portions 75*b* . . .

The actions of the exhaust valve 12 in the exhaust control system 11 will now be described.

Figure 11A:
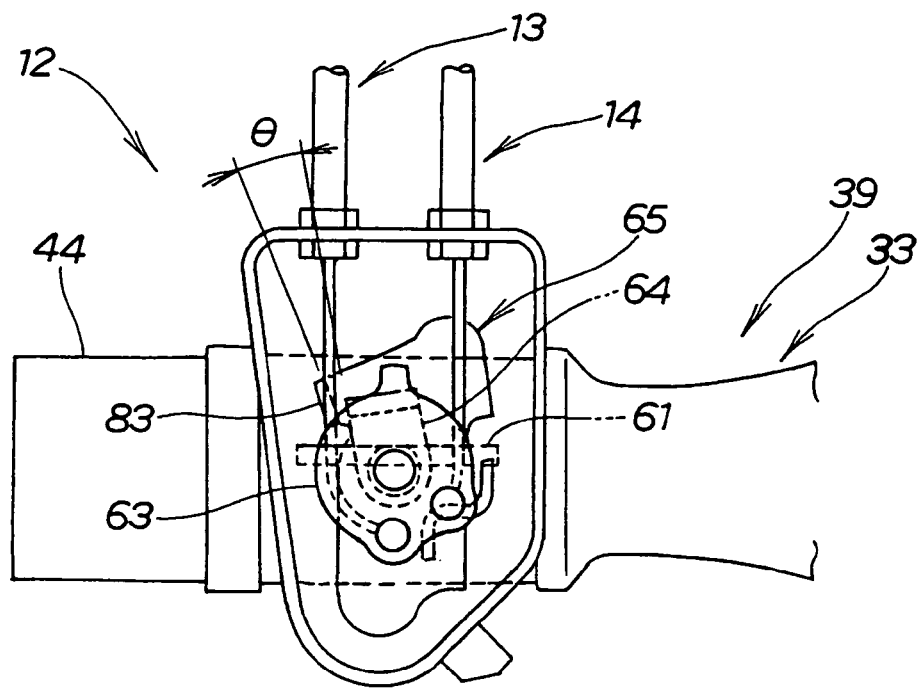
FIGS. 11(*a*) and 11(*b*) are illustrations of functions of the exhaust control system for motorcycle according to the present invention.
Figure 11B:
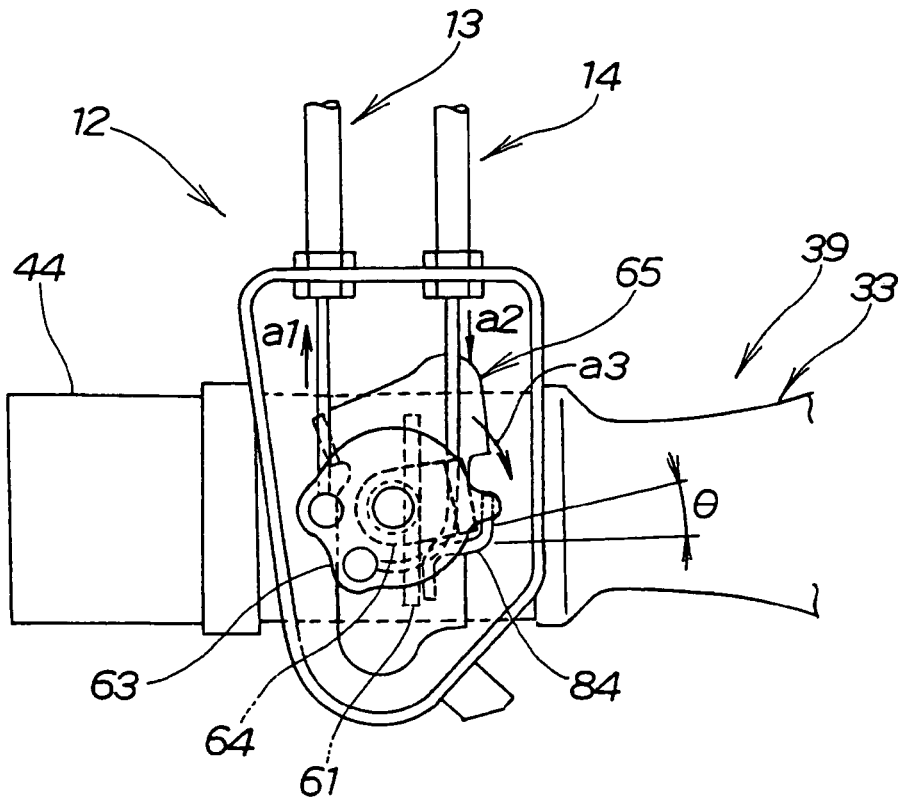

FIGS. 11(*a*) and (*b*) are illustrations of the functions of the exhaust control system for a motorcycle according to the present invention.

In FIG. 11(*a*), the exhaust valve 12 is set to an opened state in which the stopper piece 64 is fixed at a position with a margin of an angle θ (about 10°) relative to the first locking portion 83 of the stopper receiver 65. As has been described above, the valve 61 is biased in the valve-opening direction by the torsion spring 68 (see FIG. 9). Therefore, for example even where an unexpected situation such as a slackening of the operating wires 13, 14 is generated, the stopper piece 64 is abutted against the first locking portion 83, whereby the exhaust valve 12 can be kept substantially in the opened state, so that the discharge of the exhaust gas is not hampered.

In FIG. 11(*b*), the servo motor 15 (see FIG. 6) is driven wherein the operating wire 13 is pulled as indicated by arrow a1 with the operating wire 14 being slackened as indicated by arrow a2 and the pulley 63 is rotated as indicated by arrow a3 to bring the exhaust valve 12 into the closed state. It is shown that in the closed state of the exhaust valve 12, the stopper piece 64 is fixed at a position with a margin of an angle θ(about 10°) relative to the second locking portion 84 of the stopper receiver 65.

The second locking portion 84 can be utilized as a stopper at the time of fitting the stopper piece 64 and the pulley 63 to the width-across-flat portion 68*a* (see FIG. 8) of the one end 62*a* of the valve rod 62 and screw-engaging the nut 69 to the male screw portion 59 of the one end 62*a*. As a result, it is possible to contrive enhancement of the assemblability of the exhaust valve.

Figure 12:
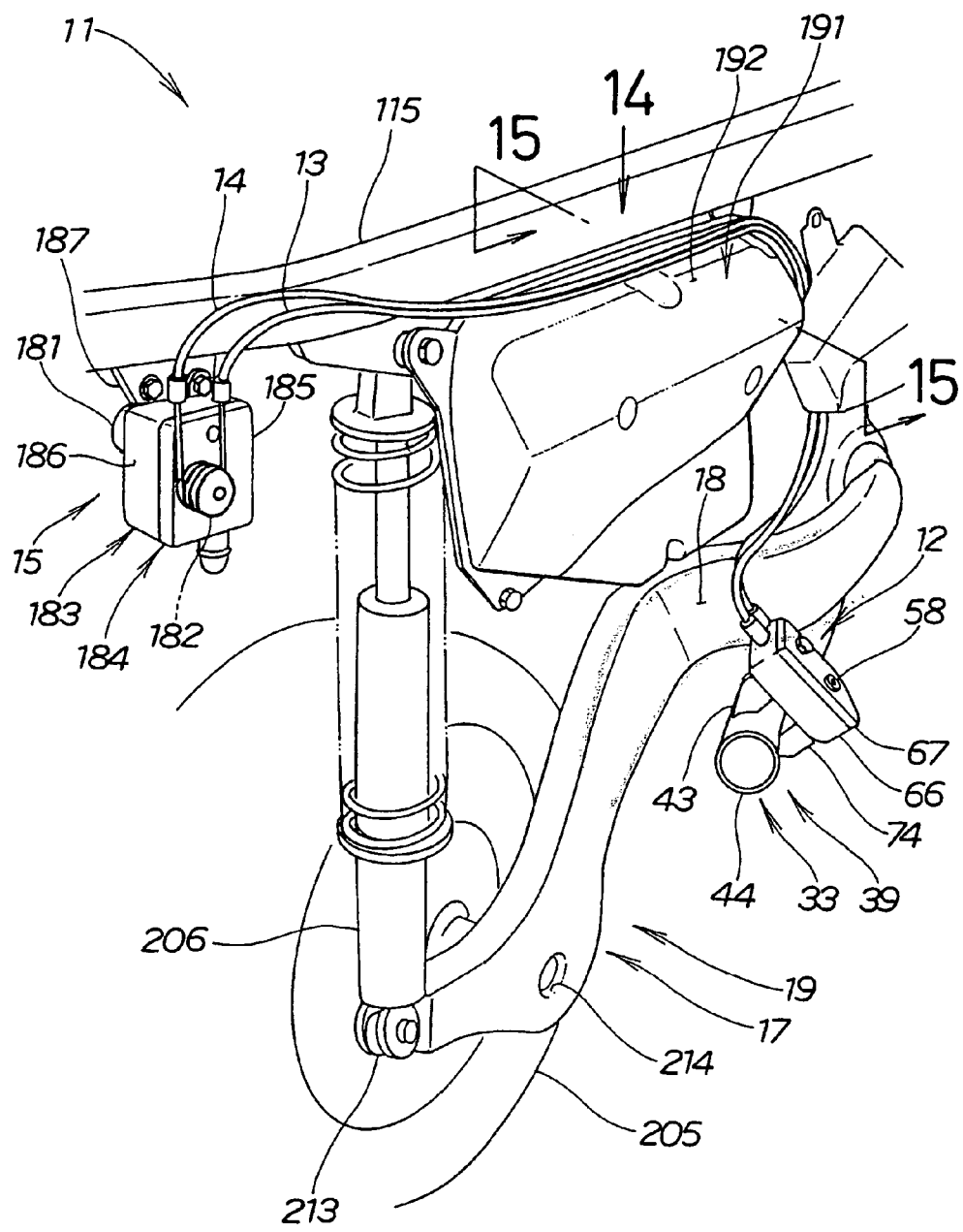
FIG. 12 is a perspective view, as viewed from the rear upper side, of the exhaust control system for motorcycle according to the present invention.

FIG. 12 is a perspective view, as viewed from the rear upper side, of the exhaust control system for motorcycle according to the present invention. The servo motor 15 includes a motor main body 181, a motor-side pulley 182 connected to the motor main body 181 through a gear train (not shown), a motor case 183 for covering the gear train and a motor cover 184 to be capped onto the motor case 183. In addition, a front end portion 185 of the servo motor 15 is provided together with a rear end portion 186 of the servo motor and a motor bracket 187 for mounting the servo motor 15 to the left seat rail 115.

Figure 13:
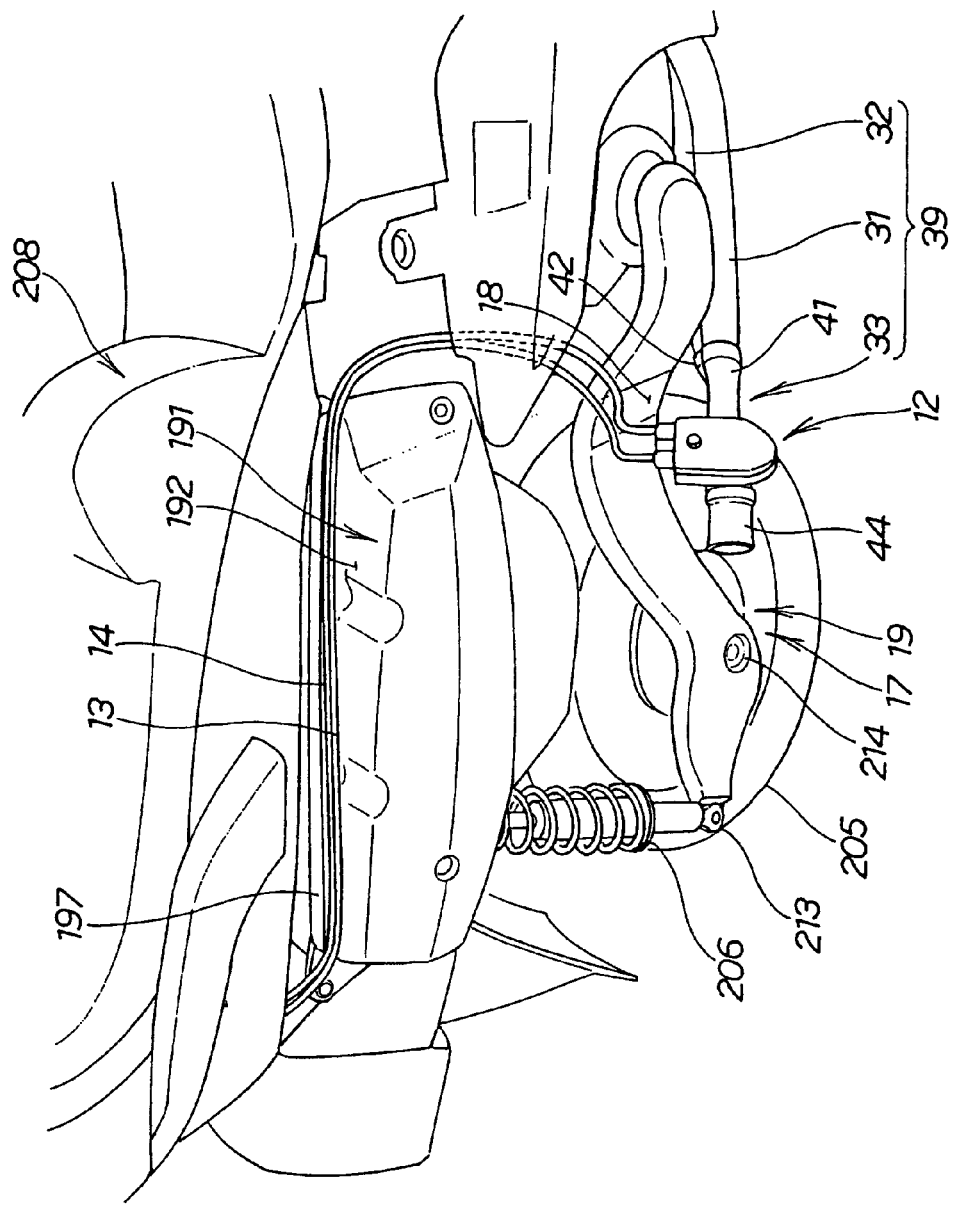
FIG. 13 is a perspective view showing a side surface of a rear portion of the exhaust control system for motorcycle according to the present invention.

FIG. 13 is a perspective view of a side surface of a rear portion of the exhaust control system for the motorcycle according to the present invention, illustrating the exhaust valve 12 for controlling the flow rate of the exhaust gas being provided in the vicinity of the connection portion 44 between the exhaust pipe 39 and the muffler 34 and on the side of the exhaust pipe 39. In the motorcycle 10 (see FIG. 2) including the engine 211 (see FIG. 6) mounted on the vehicle body frame 110 (see FIG. 4), the exhaust pipe 39 is connected to the engine 211, and the muffler 34 (see FIG. 7) is attached to the exhaust pipe 39.

For example where different mufflers are mounted to one kind of motorcycle for assorting a plurality of models in the same system of motorcycle and for coping with the tastes of the users, a system in which only the muffler can be replaced is preferable for enhancing the workability in replacement and for reducing the cost of the mufflers for replacement.

In view of this, the exhaust valve 12 for controlling the flow rate of the exhaust gas is provided in the vicinity of the connection portion 44 between the exhaust pipe 39 and the muffler 34 (see FIG. 6) and on the side of the exhaust pipe 39, whereby the muffler 34 can be replaced without influencing the exhaust valve 12.

As a result, the workability in muffler replacement can be enhanced, and the cost of the muffler 34 for replacement can be reduced.

Figure 14:
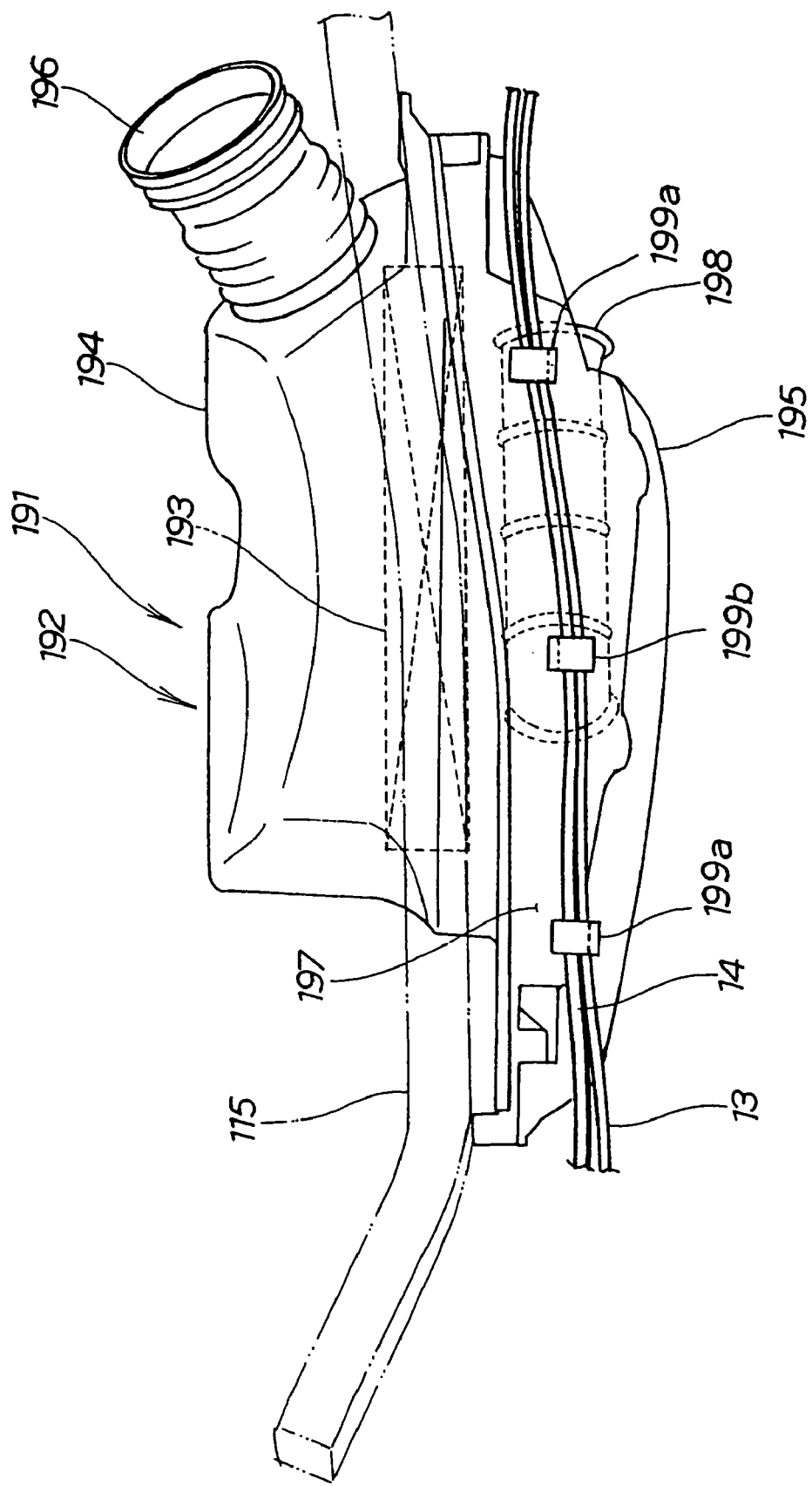
FIG. 14 is a view taken along arrow 14 of FIG. 12.

FIG. 14 is a view taken along arrow 14 of FIG. 12, and illustrating the plan view of the air cleaner 191.

The air cleaner 191 includes an air cleaner case 192 and an element 193 contained in the air cleaner case 192.

The air cleaner case 192 includes a cleaner case main body 194, and a cleaner case cover body 195 to be capped onto the cleaner case main body 194. The cleaner case main body 194 includes an air intake port 198 for taking air in, and a water-proofing wall 197 for covering the cleaner case cover body 195 to thereby prevent the penetration of rainwater. The cleaner case cover body 195 includes air blow-off port 196 for blowing off the air cleaned by the element 193.

Figure 15:
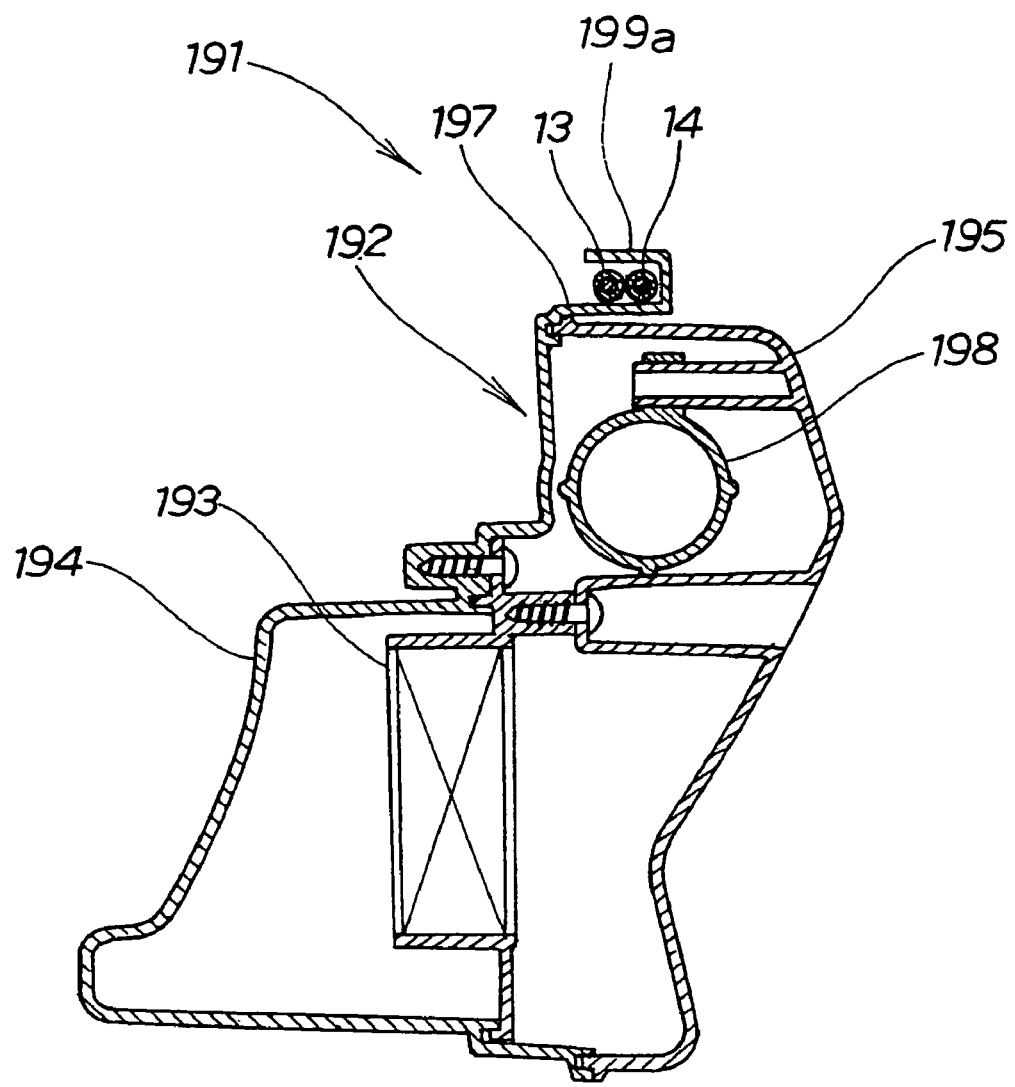
FIG. 15 is a sectional view taken along line 15-15 of FIG. 12.

FIG. 15 is a sectional view taken along line 15-15 of FIG. 12, and illustrating a cross section of the air cleaner 191. As is shown, the exhaust control system 11 has a structure in which the water-proofing wall 197 for preventing penetration of water drops is provided at an upper portion of the air cleaner case 192, and the water-proofing wall 197 is provided integrally with holding ribs 199*a*, 199*a* and a holding rib 199*b* for holding wires. In addition, the holding rib 199*a* is a rib opened toward an end portion of the water-proofing wall 197, while the holding rib 199*b* is a rib opened in the opposite direction as compared with the holding rib 199*a*.

By holding the operating wires 13 and 14 with the holding ribs 199*a*, 199*a* and the holding rib 199*b* and by laying the operating wires 13 and 14 along the water-proofing wall 197 of the air cleaner case 192, the operating wires 13 and 14 can be laid while being restricted to a predetermined route.

Figure 16:
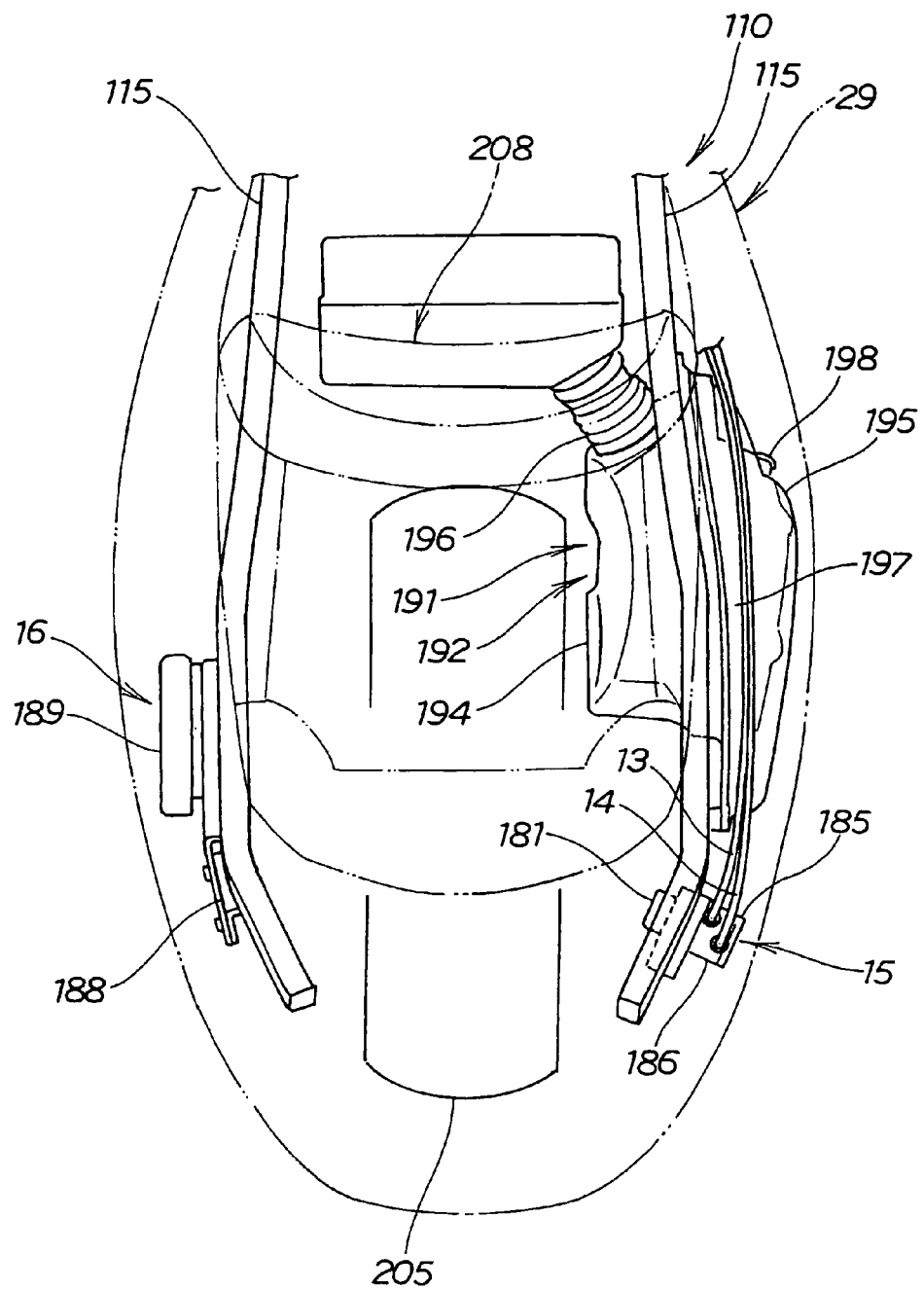
FIG. 16 is a plan view showing the layout relationship between a servo motor and a control unit in the exhaust control system for motorcycle according to the present invention.

FIG. 16 is a plan view showing the layout relationship between the servo motor and the control unit in the exhaust control system for motorcycle according to the present invention. The exhaust control system 11 (see FIG. 6) can be said to be a system in which the operating wires 13 and 14 are laid along the air cleaner case 192 so as to open and close the exhaust valve 39, and the servo motor 15 for driving the operating wires 13 and 14 is disposed at such a position that it can be covered with the seat cowl 29. The motorcycle 10 includes the air cleaner case 192 and the engine 211 mounted on the vehicle body frame 110 with the exhaust pipe 39 connected to the engine 211. The exhaust valve 12 is provided in the exhaust pipe 39 for controlling the flow rate of the exhaust gas. The seat 208 is disposed on the upper side of the engine 211 and the seat cowl 29 is provided in the surrounding of the seat 208.

For example, if the operating cables can be laid in a well-settled manner and the servo motor and the control unit can be laid out by effectively utilizing free spaces, it is preferable for enhancing the space efficiency of the vehicle body.

Since the air cleaner case 192 is a static member (i.e., a member free of movable portions), by laying the operating wires 13 and 14 along the air cleaner case 192 it is possible to lay the operating cables in a well-settled manner. In addition, by disposing the servo motor 15 at such a position that it can be covered with the seat cowl 29, it is possible to effectively utilize free space and to contrive enhancement of the space efficiency of the vehicle body.

In general, a rear portion of a seat cowl assumes a constricted shape.

In view of this, the servo motor 15 is disposed at a rear portion of the seat cowl 29 (see FIG. 2) and in an inclined state so as to approach the center of the vehicle body in the direction from a front end portion 185 toward a rear end portion 186 of the servo motor 15 in plan view, whereby the servo motor 15 can be disposed without causing the seal cowl 29 to bulge.

In addition, it is shown that the control unit 16 for controlling the opening of the exhaust valve is disposed opposite to the servo motor 15.

With the control unit 16 disposed opposite to the servo motor 15, the control unit 16 and the servo motor 15 can be dispersed. As a result, a further enhancement of the space efficiency of the vehicle body can be contrived.

It should be noted that, in the control unit 16, a holder 188 is attached to the left seat rail 115 and the holder 188 is then attached to a housing 189 of the control unit 16.

Figure 17:
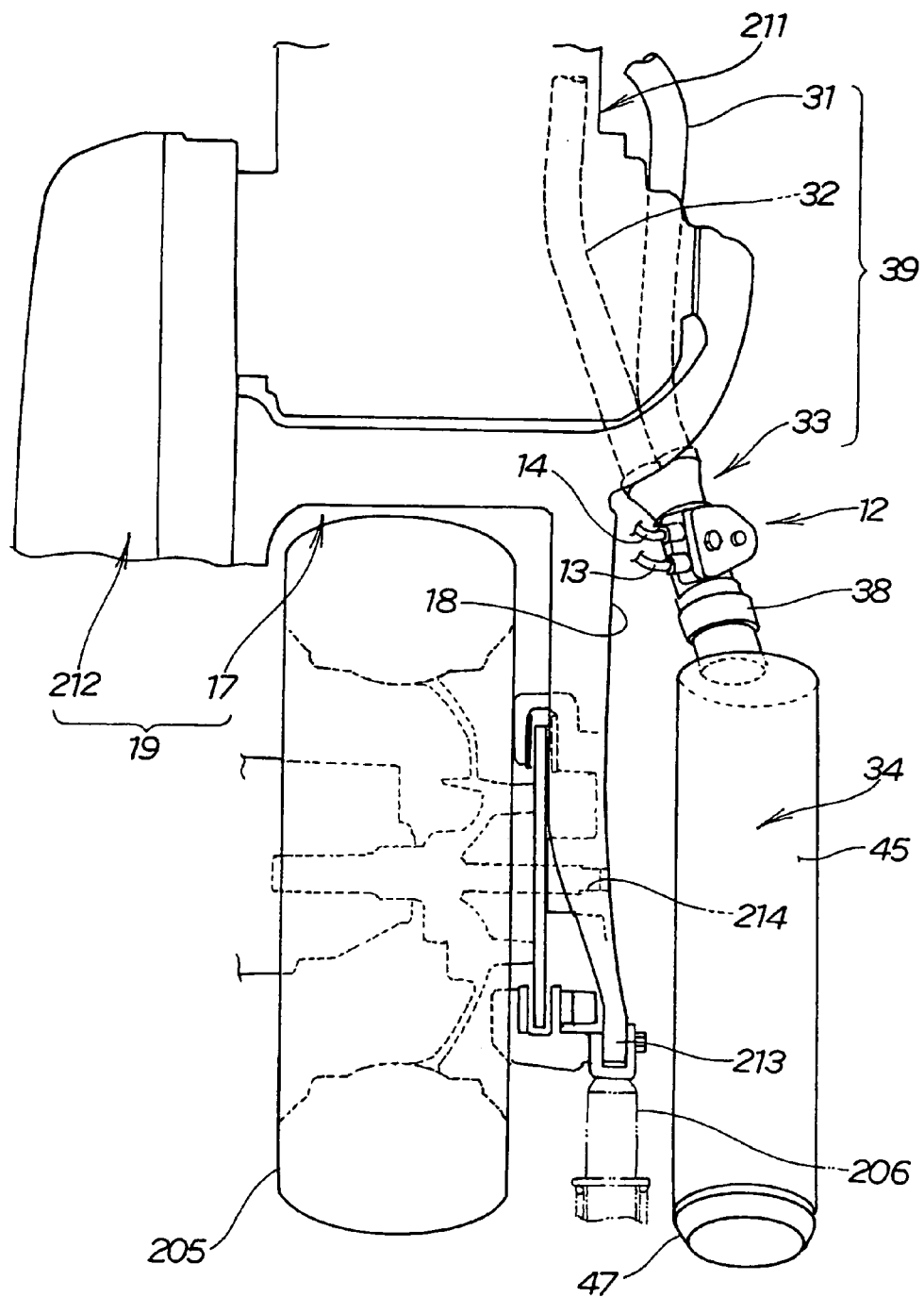
FIG. 17 is a plan view showing the layout relationship between a swing arm and an exhaust valve in the exhaust control system for motorcycle according to the present invention.

FIG. 17 is a plan view showing the layout relationship between the swing arm and the exhaust valve in the exhaust control system for a motorcycle according to the present invention. The exhaust control system 11 (see FIG. 6) can be said to be a system in which the exhaust valve 12 for controlling the flow rate of the exhaust gas is provided on the side of the exhaust pipe 39, the recessed portion 18 directed toward the center of the vehicle body is provided on the side of the swing arm 19, and the exhaust valve 12 is set to the front in the vicinity of the recessed portion 18. The motorcycle 10 includes the swing arm 19 vertically swingably mounted to the vehicle body frame 110 with the engine 211 mounted on the vehicle body frame 110, the exhaust pipe 39 connected to the engine 211, and the muffler 34 attached to the exhaust pipe 39.

For example, if the exhaust valve in the exhaust control system for motorcycle can be disposed in the exhaust pipe without enlarging the vehicle width, it is preferable from the viewpoint of an effective utilization of the layout space.

More specifically, by providing the swing arm 19 with the recessed portion 18 and disposing the exhaust valve 12 so as to front on the recessed portion 18, the exhaust valve 12 can be disposed closer to the side of the vehicle body center, and the exhaust valve 12 in the exhaust control system 11 (see FIG. 6) can be disposed in the exhaust pipe 39 without enlarging the vehicle width.

In addition, with the operating wires 13 and 14 for operating the exhaust valve 12 also set to the front on the side of the recessed portion 18, the operating wires 13 and 14 can be led out from the exhaust valve 12 without projecting to the outside of the vehicle width.

Figure 18:
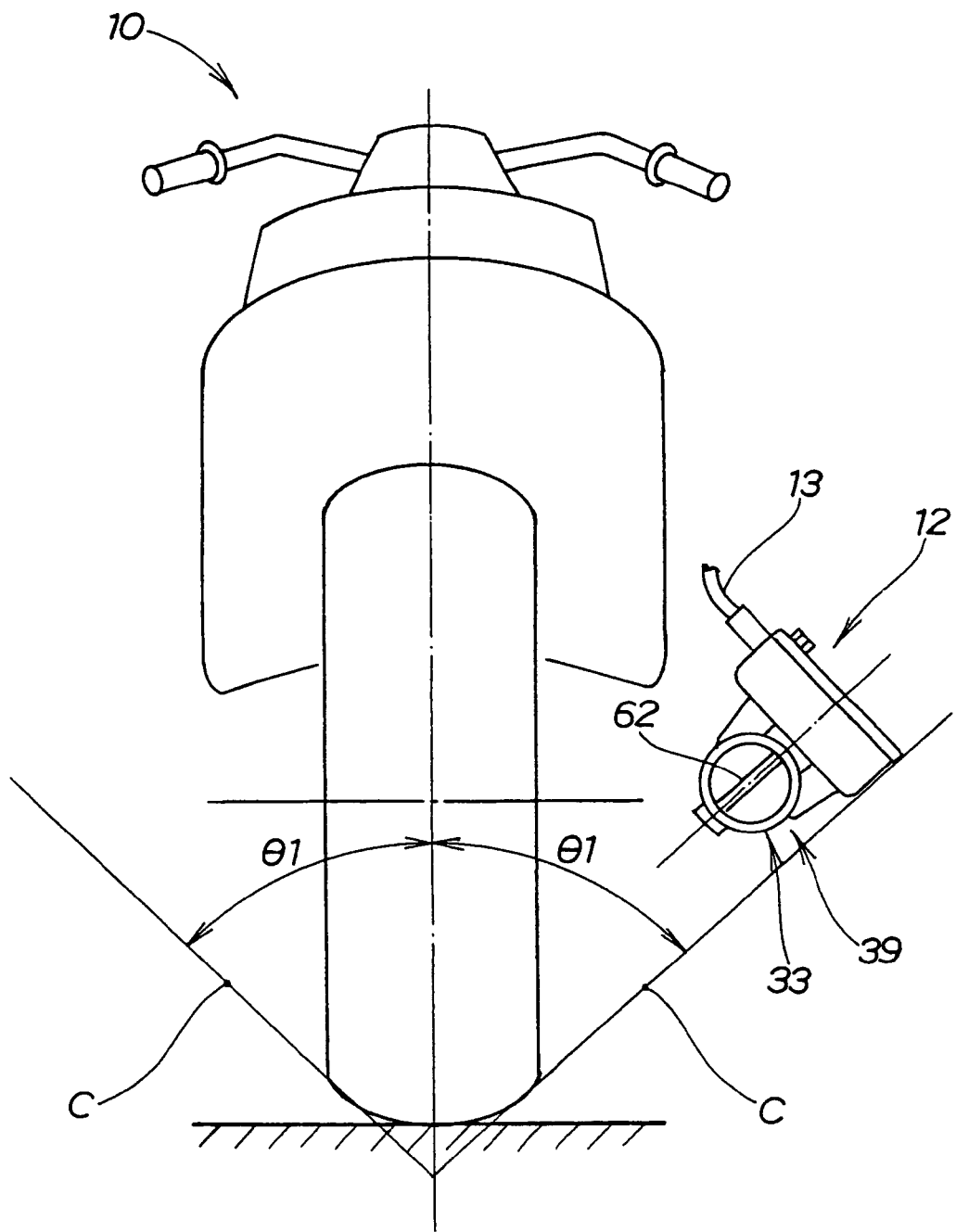
FIG. 18 is an illustration of functions for showing the mount angle of the exhaust valve in the exhaust control system for motorcycle according to the present invention.
Figure 19:
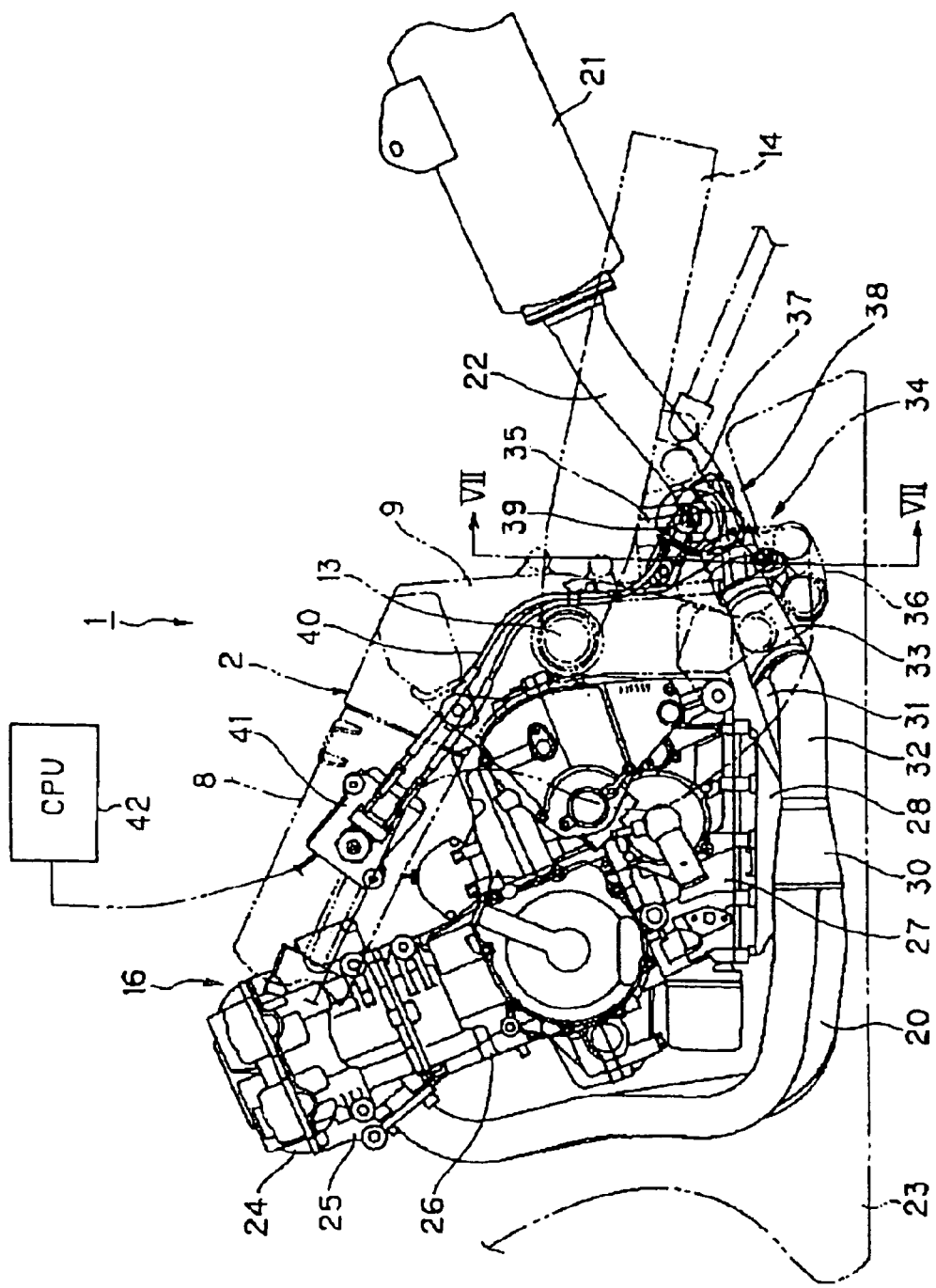
FIG. 19 is a copy of FIG. 4 of Japanese Patent Laid-open No. 2002-138828.

FIG. 18 is an illustration of the actions for showing the mount angle of the exhaust valve in the exhaust control system for a motorcycle according to the present invention. The exhaust control system 11, in the motorcycle 10 including the exhaust valve provided in the exhaust pipe 39 for controlling the flow rate of the exhaust gas, can be said to be a system in which, when the angle to which the vehicle body can be maximally inclined in the vehicle width direction to a maximum allowable bank angle $\theta 1$, the valve rod (shaft) 62 of the exhaust valve 12 is disposed substantially in parallel to the ground surface C when the vehicle body is inclined to the maximum allowable bank angle $\theta 1$.

For example, such an arrangement wherein the height from the ground can be secured sufficiently and the operating wires can be led out easily is an item to be taken into account in providing the exhaust pipe with the exhaust valve.

With the valve rod (shaft) 62 of the exhaust valve 12 disposed substantially in parallel to the ground surface C when the vehicle body is inclined to the maximum allowable bank angle $\theta 1$, it is possible to suppress the projection of the exhaust valve 12, to dispose the exhaust valve 12 on the inside of the maximum allowable bank angle, and to easily lead out the operating wires 13 and 14 (14 on the depth side is not shown) from the exhaust valve.

In addition, while the exhaust pipe 39 has been described to be composed of the two pipes 31 and 32 and the exhaust collecting pipe 33 as shown in FIG. 7 in the above-described embodiment, this configuration is not limitative. The exhaust pipe 39 may be composed of one pipe only, or may have a configuration in which two pipes are connected to a first exhaust collecting pipe with two other pipes being connected to a second exhaust collecting pipe, and a connection pipe for connection of the first and second exhaust collecting pipes being provided.

Namely, in the exhaust pipe, the number of pipes extending from cylinders of the engine is arbitrary, and the connection of these pipes is also arbitrary, inasmuch as the exhaust valve for controlling the flow rate of the exhaust gas is provided in the vicinity of the connection portion between the exhaust pipe and the muffler and on the exhaust pipe side.

While the stopper piece 64 is fixed at a position with a margin of an angle $\theta$ (play angle) relative to the first locking portion 83 of the stopper receiver 65 and the stopper piece 64 is fixed at a position with a margin of an angle $\theta$ (play angle) relative to the second locking portion 84 of the stopper receiver 65 as shown in FIGS. 11(*a*) and 11(*b*) in the above-described embodiment, this configuration is not limitative; namely, the play angle of the stopper piece 65 relative to the first locking member 83 and the play angle of the stopper piece 65 relative to the second locking member 84 may not necessarily be the same.

The vehicle body structure for the motorcycle according to the present invention is preferable for adoption for motorcycles on which a multi-cylinder engine is mounted.

Figure 20:
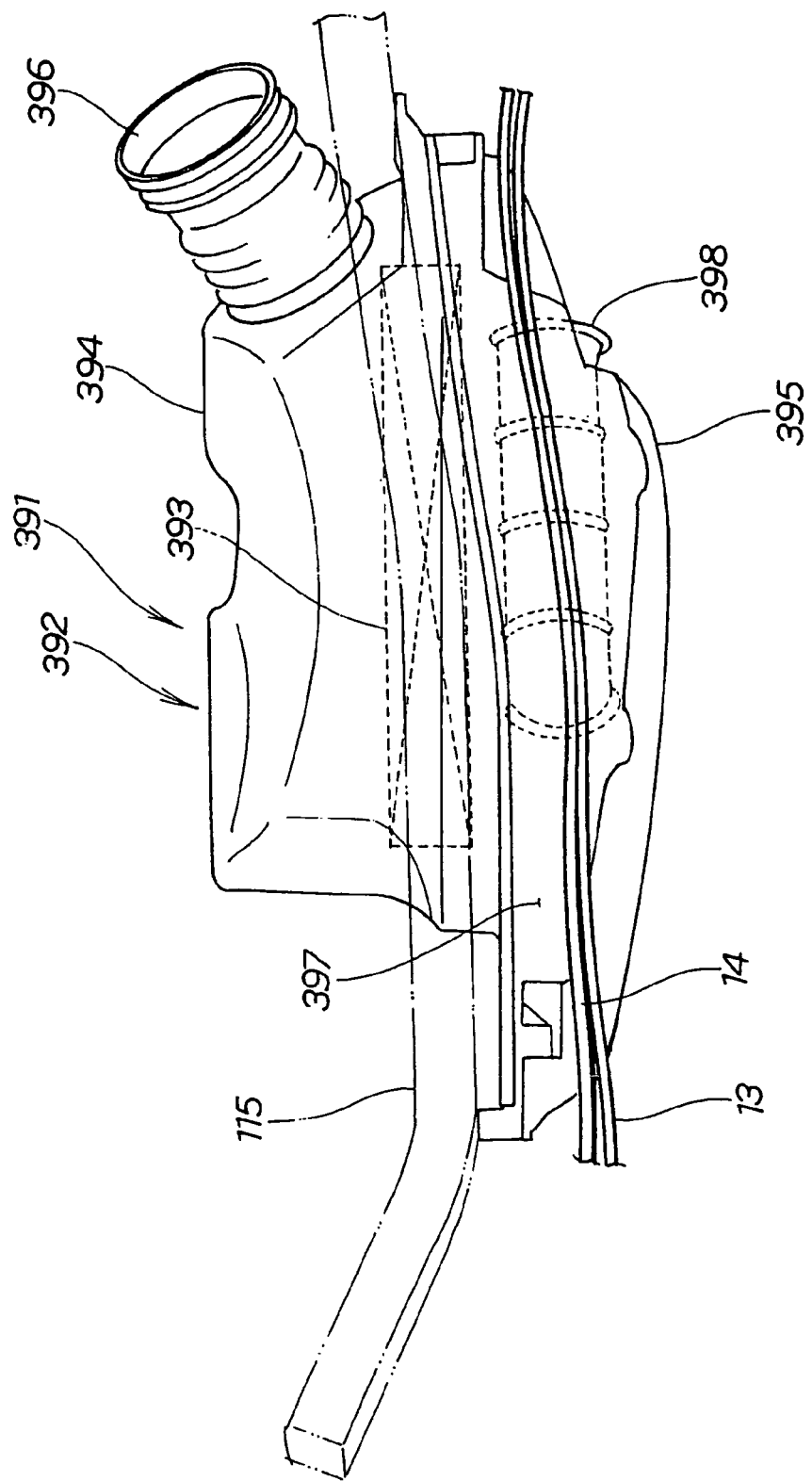
FIG. 20 is a plan view of an air cleaner according to another embodiment of the exhaust control system for a motorcycle according to the present invention.

FIG. 20 is a plan view of the air cleaner according to another embodiment of the exhaust control system for motorcycle according to the present invention.

The air cleaner 391 includes an air cleaner case 392 and an element 393 contained in the air cleaner case 392.

The air cleaner case 392 includes a cleaner case main body 394 and a cleaner case cover body 395 to be capped onto the cleaner case main body 394. The cleaner case main body 394 includes an air intake port 396 for taking air in, and a waterproofing wall 397 for covering the cleaner case cover body 395 to thereby prevent penetration of rainwater. The cleaner case cover body 395 includes an air blow-off port 398 for blowing off the air cleaned by the element 393.

Figure 21:
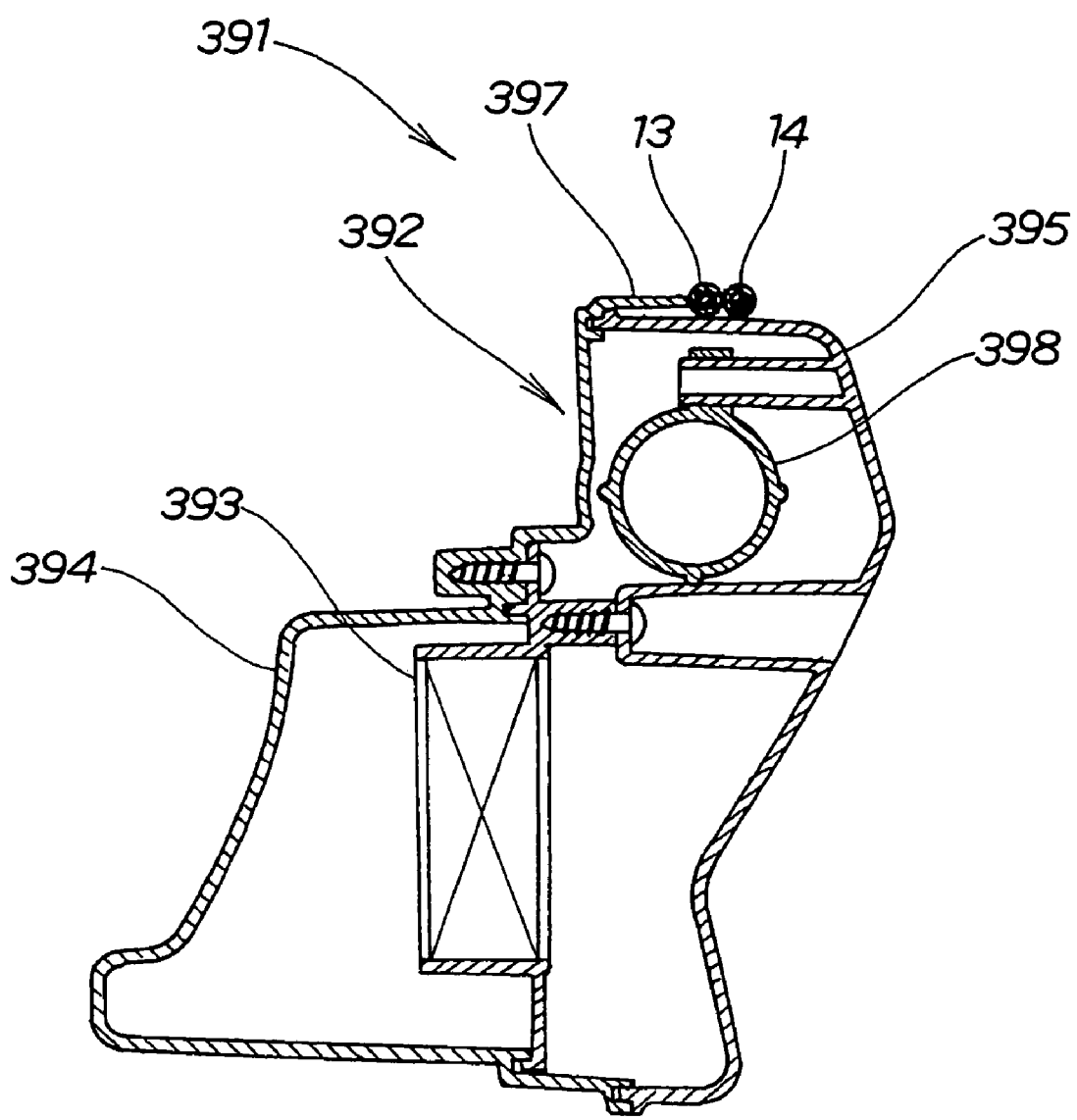
FIG. 21 is a sectional view of the air cleaner according to the other embodiment of the exhaust control system for a motorcycle according to the present invention.

FIG. 21 is a sectional view of the air cleaner according to the other embodiment of the exhaust control system for a motorcycle according to the present invention illustrating that the air cleaner 391 includes the water-proofing wall 397 for preventing penetration of water drops which is provided at an upper portion of the air cleaner case 392, and the operating wires 13 and 14 are laid along the water-proofing wall 397.

With the operating wires 13 and 14 laid along the water-proofing wall 397 of the air cleaner case 392, it is possible to lay the operating wires 13 and 14 while restricting them to a predetermined route.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An exhaust control system for a motorcycle comprising:
    a swing arm vertically swingably mounted to a vehicle body frame, the swing arm having a recessed portion on a side of the swing arm, the recessed portion being directed laterally toward a center of a vehicle body;
    an engine mounted on said vehicle body frame;
    an exhaust pipe connected to said engine;
    a muffler attached to said exhaust pipe;
    an exhaust valve for controlling the flow rate of an exhaust gas, said exhaust valve being provided on a side of said exhaust pipe;
    said exhaust valve being juxtaposed and overlapping a front portion of said recessed portion of the swing arm.

2. The exhaust control system for a motorcycle as set forth in claim 1, wherein an operating wire for operating said exhaust valve is also disposed in the front on the side of said recessed portion.

3. The exhaust control system for a motorcycle as set forth in claim 1, wherein said exhaust valve for controlling the flow rate of the exhaust gas is provided in the vicinity of a connection portion between said exhaust pipe and said muffler and on the side of said exhaust pipe.

4. The exhaust control system for a motorcycle as set forth in claim 1, and further including a valve rod having a proximal end operatively connected to said exhaust valve and a distal end extending outwardly therefrom and further including a pulley operatively connected to the distal end of said valve rod for rotating the valve rod.

5. The exhaust control system for a motorcycle as set forth in claim 4, and further including an L-shaped stopper piece formed separately from the pulley and attached to the valve rod and a stopper receiver for engaging the stopper piece for restricting the opening and closing angle of the exhaust valve.

6. The exhaust control system for a motorcycle as set forth in claim 1, and further including a biasing member for biasing the exhaust valve in an open position.

7. The exhaust control system for a motorcycle as set forth in claim 6, wherein the biasing member is positioned between the pulley and the stopper receiver.

8. An exhaust control system for a motorcycle comprising:
    an air cleaner case and an engine mounted on a vehicle body frame;
    an exhaust pipe connected to said engine;
    an exhaust valve for controlling the flow rate of an exhaust gas, said exhaust valve being provided in said exhaust pipe;
    a seat disposed directly above said engine; and
    a seat cowl surrounding said seat; and
    an operating wire for selectively opening and closing said exhaust valve, the operating wire extending upwardly from the exhaust pipe, along an upper side of the air cleaner case, and extending rearwardly to a servo motor for driving the operating wire,
    wherein the servo motor and the air cleaner are fixed to a rear frame of the vehicle body frame in a space that is covered with said seat cowl, thereby enhancing space efficiency of the motorcycle.

9. The exhaust control system for a motorcycle as set forth in claim 8, wherein an upper portion of the air cleaner case includes a waterproofing wall for preventing penetration of water drops,
    the waterproofing wall being provided with holding ribs for securely fastening said operating wire along said waterproofing wall.

10. The exhaust control system for a motorcycle according to claim 9, wherein a control unit for controlling the opening of said exhaust valve is disposed opposite to said servo motor.

11. The exhaust control system for a motorcycle according to claim 8, wherein said servo motor is disposed at a rear portion of said seat cowl, the servo motor being disposed in an inclined state so that, when seen from above, a rear end portion of said servo motor is closer to a center of a vehicle body than is a front end portion of said servo motor.

12. The exhaust control system for a motorcycle according to claim 8, wherein the air cleaner case is disposed behind the engine and said servo motor is disposed behind the air cleaner case.

13. The exhaust control system for a motorcycle according to claim 8, wherein a control unit for controlling the opening of said exhaust valve is disposed opposite to said servo motor.

14. The exhaust control system for a motorcycle according to claim 8, wherein in order to further enhance the space efficiency of the motorcycle, a control unit for controlling the opening of said exhaust valve is disposed in the space covered by the seat cowl on one side of the motorcycle and said servo motor is disposed in the space covered by the seat cowl on an opposite side of the motorcycle.

15. An exhaust control system for a motorcycle comprising:
    a swing arm swingably mounted to a vehicle body frame, one side of the swing arm having a recessed portion that is indented laterally toward a center of the vehicle body;
    an engine mounted on the vehicle body frame;
    an exhaust pipe connected to said engine;
    a muffler attached to said exhaust pipe; and an exhaust valve for controlling the flow rate of an exhaust gas, said exhaust valve being provided in a portion of said exhaust pipe that overlaps the recessed portion of the swing arm when viewed in side view;

wherein said muffler is provided with a muffler protector, the muffler protector including a main body portion overlapping substantially an entire length of the muffler for covering a side surface of the muffler, and a cover portion integrally extending from the main body portion toward a front side of the motorcycle so as to cover the exhaust valve.

16. The exhaust control system for a motorcycle according to claim 15, wherein said wherein said exhaust valve is provided with a mount portion for mounting said cover portion of the muffler protector thereto.

17. The exhaust control system for a motorcycle according to claim 16, and further including an elastic bushing being provided between a bolt and said exhaust valve for securing the cover portion of the muffler protector to the exhaust valve.

18. The exhaust control system for a motorcycle according to claim 15, and further including a muffler guard secured to the muffler and the exhaust valve and being positioned juxtaposed relative to said muffler.

19. The exhaust control system for a motorcycle according to claim 18, and further including a plurality of elastic bushings and bolts for mounting the muffler protector, the muffler guard and the cover portion of the muffler protector relative to said muffler and said exhaust valve.

20. The exhaust control system for a motorcycle according to claim 15, when viewed in side view the main body portion of the muffler protector has a profile that is substantially rectangular in shape, and the cover portion of the muffler protector has a profile that is substantially triangular in shape.

21. The exhaust control system for a motorcycle according to claim 15, wherein a vertical dimension of the main body portion of the muffler protector is less than a diameter of the muffler, the muffler extending above and below the main body portion of the muffler projector when viewed in side view.

22. The exhaust control system for a motorcycle according to claim 15, further comprising a tail pipe assembly fixed to a rear end of the main body portion of the muffler.

23. The exhaust control system for a motorcycle according to claim 15, further comprising a tail pipe assembly mounted to the muffler, wherein the muffler protector does not overlap the tail pipe assembly when viewed in side view.

* * * * *